US006521072B1

(12) United States Patent
Campbell

(10) Patent No.: US 6,521,072 B1
(45) Date of Patent: Feb. 18, 2003

(54) METHOD OF COUPLING PROFILE WALL THERMOPLASTIC PIPES

(75) Inventor: Steve Campbell, Richmond Heights, MO (US)

(73) Assignee: C&S Intellectual Properties, LLC, Richmond Heights, MO (US)

( * ) Notice: Subject to any disclaimer, the term of this patent is extended or adjusted under 35 U.S.C. 154(b) by 42 days.

(21) Appl. No.: 09/645,249

(22) Filed: Aug. 24, 2000

Related U.S. Application Data

(63) Continuation-in-part of application No. 09/134,412, filed on Aug. 13, 1998, now Pat. No. 6,131,954, which is a continuation-in-part of application No. 08/654,104, filed on May 28, 1996, now Pat. No. 5,820,720.

(51) Int. Cl.⁷ .............................................. B65H 69/02

(52) U.S. Cl. ..................... 156/158; 156/159; 156/211; 156/296

(58) Field of Search ........................ 138/109; 156/273.9, 156/274.2, 304.3, 304.5, 158, 159, 296, 211, 197; 219/552; 285/21.1, 21.2, 21.3, 22, 330, 331, 334.2, 915, 423

(56) References Cited

U.S. PATENT DOCUMENTS

| 2,741,402 A | 4/1956 | Sayre |
| 2,785,910 A | 3/1957 | Munger |
| 3,061,503 A | 10/1962 | Gould et al. |
| 3,095,112 A | 6/1963 | Weinstein et al. |
| 3,422,179 A | 1/1969 | Bauer et al. |
| 3,768,841 A | 10/1973 | Byrne et al. |
| 3,961,814 A | 6/1976 | Byrne et al. |
| 4,090,899 A | 5/1978 | Reich |
| 4,176,274 A | 11/1979 | Lippera |

(List continued on next page.)

FOREIGN PATENT DOCUMENTS

| CH | 423 209 | 10/1963 |
| DE | 3720577 A1 | 4/1988 |
| DE | 42 21 454 A1 | 3/1994 |
| EP | 0 416 317 A2 | 10/1990 |

OTHER PUBLICATIONS

"Industrial Catalog" by *Central Plastics Company*, 1901 W. Independence, Shawnee, Oklahoma USA, 74802–3129, pp. 1–24.

"We're Not Just Another Pipe Company We're The Polyethylene Pipe Advantage" by *Poly Systems Incorporated*, Route 1, Box 486, Steelville, Missouri 65565.

"Liners Give Rusted Culverts New Life, Higher Capacity" by *Roads & Bridges*, Feb., 1994, p. 42.

"Permacore" by *Phillips Driscopipe, Inc.* (a subsidiary of Phillips 66 Company), 1990, pp. 1–12.

*Primary Examiner*—Richard Crispino
*Assistant Examiner*—George R. Koch, III
(74) *Attorney, Agent, or Firm*—Thompson Coburn LLP

(57) ABSTRACT

A method is disclosed for forming a substantially flush joint or coupling between two profile wall thermoplastic pipes. The method comprises removing substantially all of the helical rib and inner wall of a first pipe for a distance from an end of the first pipe and removing a portion of the helical rib for a distance from an end of a second pipe. By so doing, the outer wall of the second pipe can be deflected radially inward and the end of the second pipe can thereby be coupled with the first pipe by overlapping the outer walls adjacent the ends of the first and second pipes, with the outer wall of the first pipe being on the exterior. When overlapped, the second walls of both the pipes can then be fused together. Alternatively, the outer wall of the first pipe can be removed rather than the inner wall, and the inner wall of the second pipe deflected radially outward such that the inner wall of the second pipe can be positioned around the inner wall of the first pipe and fused thereto. Finally, the above configurations could alternatively be preformed on the pipes without requiring removal of any material.

20 Claims, 11 Drawing Sheets

U.S. PATENT DOCUMENTS

| | | |
|---|---|---|
| 4,274,662 A | 6/1981 | de Groot et al. |
| 4,341,392 A | 7/1982 | Dongeren |
| 4,365,144 A | 12/1982 | Reich et al. |
| 4,526,410 A | 7/1985 | Vohrer |
| 4,530,520 A | 7/1985 | Nyffeler et al. |
| 4,530,521 A | 7/1985 | Nyffeler et al. |
| 4,649,641 A | 3/1987 | Sichler |
| 4,770,442 A | 9/1988 | Sichler |
| 4,865,674 A | 9/1989 | Durkin |
| 4,906,313 A | 3/1990 | Hill |
| 4,919,461 A | 4/1990 | Reynolds |
| 5,071,173 A * | 12/1991 | Hegler ................ 285/138 |
| 5,096,528 A | 3/1992 | Durrenberger et al. |
| 5,099,888 A | 3/1992 | Valls |
| 5,150,922 A | 9/1992 | Nakashiba et al. |
| 5,328,210 A | 7/1994 | Stafford et al. |
| 5,336,351 A | 8/1994 | Meyers |
| 5,362,112 A | 11/1994 | Hamilton et al. |
| 5,362,114 A | 11/1994 | Levingston |
| 5,366,253 A | 11/1994 | Nakashiba et al. |
| 5,375,889 A | 12/1994 | Nakashiba et al. |
| 5,407,514 A | 4/1995 | Butts et al. |
| 5,407,520 A | 4/1995 | Butts et al. |
| 5,410,131 A | 4/1995 | Brunet et al. |
| 5,433,484 A | 7/1995 | Ewen et al. |
| 5,462,314 A | 10/1995 | Goto et al. |
| 5,494,318 A | 2/1996 | Butts et al. |
| 5,919,387 A * | 7/1999 | Buckley et al. ............ 219/633 |
| 6,059,319 A | 5/2000 | Wyke |

* cited by examiner

METHOD OF COUPLING PROFILE WALL THERMOPLASTIC PIPES

CROSS REFERENCE TO RELATED APPLICATIONS

This application is a continuation-in-part of U.S. patent application Ser. No. 09/134,412 filed on Aug. 13, 1998, issued as U.S. Pat. No. 6,131,954 which is a continuation-in-part of U.S. application Ser. No. 08/654,104 filed on May 28, 1996, issued as U.S. Pat. No. 5,820,720 on Oct. 13, 1998, the disclosures of which are incorporated herein by reference.

FIELD OF THE INVENTION

This invention relates generally to the electrofusion welding of profile wall pipes made from thermoplastic materials including polyethylene, polyvinyl chloride, nylons, polybutylene, polypropylene, and the like. Specifically, this invention relates to electrofusion welding of such pipes to obtain a joint which has substantially flush interior and exterior surfaces and provides constant inside and outside diameters, without the need for a coupler.

BACKGROUND OF THE INVENTION

This invention pertains to the joining of profile wall thermoplastic pipes including polyolefin, polyethylene, polyvinyl chloride, nylon, polybutylene, polypropylene, and the like. These types of pipes are gaining popularity in water, sewer, culverts, and industrial piping because of their characteristics of being lightweight, corrosion resistance, strong, and durable.

"Trenchless" rehabilitation of culverts, storm sewers, sanitary sewers, and other underground pipes by "slip lining" or "insert renewal" using thermoplastic pipes is gaining popularity and growing rapidly throughout the United States and other countries. In this process, a thermoplastic pipe or liner is inserted into an existing pipe or culvert without removal of the deteriorated pipe. The replacement pipe is pushed into or pulled through the existing culvert. In many cases, an existing pipeline can be rehabilitated for a fraction of the cost of replacement and with minimal inconvenience to the public.

Thermoplastic pipes, including polyethylene, are the preferred pipe material for many rehabilitation projects because of the price and the above-noted characteristics of such pipe. Generally, thermoplastic pipe is manufactured in lengths which are sufficiently short to permit transportation and handling. In the field where the pipe is to be installed, the short pipe sections must be connected to form a continuous pipe of a predetermined length appropriate for the application.

The joining or connecting of thermoplastic pipes can present many problems because of the variety of field conditions encountered and because of the chemical resistance of the thermoplastic pipes which, in many cases, makes such pipes impervious to glues or cements. Additionally, some thermoplastic pipes have a tendency to "creep," or move, when subjected to changing temperatures. Because most applications include exposure to such temperature changes, such movement or "creeping" limits the ability to use mechanical type joints such as threads.

In general, several methods exist to join thermoplastic pipe in the field. A first method, known in the art as "butt fusion," involves the use of a heat fusion machine which includes line up equipment and a heat plate. The ends of two pipes to be joined are inserted into the line up equipment which aligns and advances the pipe ends toward one another as necessary. The two pipe ends are pressed against the heat plate which heats and softens the two pipe ends. The heat plate is then removed and the line up equipment advances the two pipes toward one another at a predetermined rate (depending on the size and thickness of the pipe walls) in order to fuse the pipe ends together. This type of butt fusion requires special fusion equipment that is expensive, is not always available in the field, and cannot be used with certain types of pipe.

Another method known in the art is the use of electrofusion collars or inserts. One type of electrofusion collar is shown in U.S. Pat. No. 4,530,521 to Nyffeler, et al. and one type of electrofusion insert is shown in U.S. Pat. No. 3,768,841 to Byrne at al. These devices, as shown in the references, use a sleeve, collar, or insert made of thermoplastic material which either fits over or into the two pipes being joined. The pipes, and the collar or insert are first heated to soften the thermoplastic material. If using a collar, the pipe ends are inserted into the collar and are thereby joined. If using an insert, the insert is inserted into each pipe end, thereby joining the pipes. The heating can be performed with fusion equipment or, alternatively the collar or insert can contain an electrical resistance element to provide the necessary heat to cause electrofusion welding between the pipes and the collar or insert.

These devices have various disadvantages, including the creation of interior obstructions or exterior protrusions which are not acceptable in many applications. For example, because the collar must be large enough to accept insertion of the pipe ends, the resulting joint does not have a flush exterior. Additionally, because the insert reduces the inside diameter of the pipes at the joint, the insert acts as an obstruction to flow through the pipe. This is unacceptable in most applications, including most trenchless rehabilitation projects, because interior flow obstruction is not acceptable. Furthermore, exterior collars impede insertion of the replacement pipe during slip lining, as known in the art, thereby requiring the use of smaller diameter replacement pipes so that the collar can fit over the pipe and the entire coupling can still fit inside the existing pipe or culvert.

Another method of joining thermoplastic pipes utilizes electrofusion rods or mesh as shown in U.S. Pat. No. 5,410,131 to Brunet et al. Although this method requires no collar or insert, the application requires substantial end pressure to join the two pipe ends. Due to the weight of the pipes, such pressure is usually supplied by special line up equipment and this equipment is expensive and not always available or practical for use in field conditions.

Another method, hot air gun welding, uses a welding rod of thermoplastic material fed through the nozzle of a hot air gun. The hot air gun applies heat to the ends of the pipes being welded and melts the welding rod which is applied to a bevel cut between the two ends of the pipes to be joined. As with the butt fusion methods, line up equipment must be used and this method has not proven satisfactory in field conditions due to a lack of uniformity in the weld.

As thermoplastic resin prices increase, plastic pipe manufacturers are constantly looking for manufacturing methods to make pipe lighter without reducing physical strength. One type of thermoplastic pipe that has been developed to address these concerns, and that is gaining popularity, is "profile wall pipe" as it is known in the art. An example of this type of pipe is shown in U.S. Pat. 5,362,114 to Levingston. Profile wall pipe is thermoplastic pipe formed by extrusion to have an inner cylindrical wall, a generally concentric outer cylindrical wall, and a helical rib between and connecting the inner wall and outer wall.

Profile wall pipe is lighter than solid pipe and is created with less material, thereby reducing resin costs, but maintains a high degree of strength. Because of its light weight, profile wall pipe generally has a competitive advantage over solid wall plastic pipe. For these and other reasons, profile wall pipe is popular in the industry. Unfortunately, conventional methods of fusing solid wall thermoplastic pipe are unacceptable and will not work on profile wall pipe. This is due, in part, to the configuration of the end wall of the profile wall pipe which does not provide a solid annular surface due to the presence of the helical rib.

For example, butt fusion is very difficult on profile wall pipe because the pipe ends of profile wall pipe are not solid. The profile wall pipe ends have a thin inner wall, a thin outer wall, and a "profile space" between the inner and outer walls, the axial depth of which is equal to the distance between the end of the pipe and the helical rib which connects the inner and outer walls. The same problems that exist in joining solid wall thermoplastic pipes are multiplied in profile wall pipes because of their relatively thin inner and outer walls and large profile space between the walls.

For example, one manufacturer produces a polyethylene 10" inside diameter profile wall pipe that has inner and outer wall thicknesses of 0.065" to 0.079". This particular pipe has a profile space of approximately 0.5" between the inner and outer walls with an outside diameter of up to approximately 11.20". A 36" inside diameter profile wall pipe from the same manufacturer has inner and outer wall thicknesses of approximately 0.195" to 0.228" and an outside diameter of approximately 40.65", thereby having a profile space between the inner and outer walls of approximately 2".

Butt fusion of profile wall pipes is very difficult due to the thin wall thickness compared to the overall diameter. Setting the correct hydraulic pressure on a butt fusion machine for such thin walls and large diameters would result in extremely slow fusion machine carriage movement and potential cooling of the thermoplastic material prior to fusion joining. This results in a failed weld or "cold joint" as known in the art. Additionally, rods or mesh will not work on profile wall pipe because profile wall pipe does not have solid flat pipe end surfaces which are required when using those methods.

For example, U.S. Pat. No. 5,494,318 to Butts et al. discloses a secondary containment piping system composed of a plurality of modules of concentric pipe. However, the invention of Butts would not work with profile wall pipe because when joining concentric pipes together using the apparatus of Butts, one must use line-up equipment. Dual containment pipe, unlike profile wall pipe is essentially two separate thermoplastic solid wall pipes with walls of sufficient thickness such that butt fusion is a readily acceptable means of forming joints. In addition, as disclosed in Butts, a welding rod is placed between the solid ends of the pipe members being joined, pressure is applied and maintained while an electric current is passed through wires causing the melting of the core of the welding rod and the adjacent portions of the pipe members. The pressure is maintained after the current is discontinued until the members are fused together. Column 1, lines 35–45. Specifically, Butts discloses positioning an annulus of welding rod between the ends to be joined and butting the ends together with the appropriate maintenance of pressure while an electric current is supplied for a sufficient time to cause fusion of the members and the welding rod. This will simply not work with profile wall pipe for the reasons stated above. Additionally, in order for this type of pipe fusion to work, the wall thickness of the inner and outer walls would have to be increased to such an extent that the advantages of using profile wall pipe would be lost. Moreover, dual containment pipe is not satisfactory for all applications in which profile wall pipe is commonly used for the reasons noted above.

Butts also discloses the use of a "fusion ring" for coupling sections of dual containment pipe. However, Butts requires the use of a welding rod element internally within the fusion ring. The ends of the pipe being joined are received in opposite sides of the ring where they are held in position as the welding rod is heated and fused with the ends of the pipe to form the complete joint. The fusion ring is in the form of a collar surrounding the welding rod, the collar having an inner diameter substantially equal to the outside diameter of the sections to be joined. The fusion ring is positioned between two sections of pipe as in a socket fitting and the two sections are then welded together while pressure is applied to push the pipes together.

The fusion ring disclosed in Butts et al. is not acceptable for profile wall pipe and causes interior and exterior protrusions which impede flow and impede the use of the pipe during sliplining of culvert systems. Moreover, dual containment pipe is distinct from, and does not have the advantages of, profile wall pipe. Dual containment pipe is essentially two solid wall pipes concentric with one another. Thus, those methods of joining pipe that work with solid wall pipe will work with dual containment pipe, but not with profile wall pipe. Therefore, the invention disclosed in Butts would not be applicable to nor functional with profile wall pipe to obtain the advantages provided by the invention disclosed herein.

For example, profile wall pipe, unlike dual containment pipe, is not two separate concentric pipes. In fact, profile wall pipe is a single pipe, which, as explained above, is extruded and used for its lightweight replacement capabilities. However, the inner and outer walls of the profile wall pipe are so thin that the welding rod of Butts would not work to butt weld profile wall pipe and, for the reasons discussed above, nor can one easily butt fuse profile wall pipe using line-up equipment due to the complexity of the process and the length of time and pressure that would be required to cause the pieces of pipe to fuse together. Moreover, in order to prevent the protrusion of the welding rod into and out of the pipe so as to maintain flush surfaces at a butt weld, one would be required to use such a thin welding rod that it would not be sufficient to carry enough current and make a sufficiently consistent weld.

Another method, hot gas welding, when used with profile wall pipes, does not achieve a strong, uniform joint even with the most experienced welders. Prior art electrofusion collars or inserts are very bulky and either seriously interrupt interior fluid flow or have a very large collar on the outside of the pipe, making the pipe joint unsuitable for slip lining or pipe rehabilitation applications.

One method for joining profile wall pipes is shown in U.S. Pat. No. 5,362,114 to Levingston. As shown therein, profile wall pipes are joined by threaded engagement. The threads, formed by the helical rib during creation of the pipe, are revealed by shaving or cutting away the inner wall of one pipe section and the outer wall of another pipe section. This allows the two pipe sections to be threaded together. However, joints formed by this method are not sealed and require the use of sealants or gaskets to make the joints liquid tight or leak-proof and, therefore, do not provide the beneficial characteristics of a fusion welded joints. For example, a fusion weld is air tight whereas a threaded joint, even with sealants, is not acceptable for pipelines which require air tight seals.

Thus, methods of joining pipe using prior art collars or inserts result in interior flow obstructions or exterior protrusions which prevent pipe insertion in slip lining applications. Prior art methods utilizing welding rods or mesh require line up equipment and solid wall pipe and, as such, are not acceptable for joining profile wall pipes. Additionally, prior art methods of joining pipe by threading the pipes together do not create leak proof joints without sealants or gaskets. Furthermore, specifications in many applications call for a leak-proof joint having a flush interior and exterior pipe surface that, in trenchless applications, is strong enough to withstand pulling or pushing the pipe through an existing pipeline. The above prior art methods do not satisfy these specifications.

SUMMARY OF THE INVENTION

The invention results in a uniform, strong, leak-proof joint with minimal inner or outer obstructions, making it suitable for trenchless, slip lining applications, in addition to direct burial applications. Additionally, the invention requires no fusion machine or special line-up equipment to apply end pressure. The invention may also use an electrical resistance screen element which is an improvement over resistance wires in both the cost and the uniform heat distribution a screen provides. Furthermore, the invention provides a solid profile wall pipe joint or coupling having substantially flush interior and exterior surfaces without the use of a coupler.

Building on the invention, the inventor herein has further improved his early method and apparatus for electrofusion coupling of profile wall thermoplastic pipe. As discussed in the parent, a profile wall pipe comprises an inner wall, an outer wall, and a helical rib joining the two walls together. Due to the thinness of the inner and outer walls, profile wall pipe does not lend itself to the usual bonding methods used for solid wall thermoplastic pipe.

The present invention comprises removing substantially all of either the inner or outer wall, and substantially all of the helical rib, for a predetermined distance from an end of a first pipe to be joined, thereby leaving the first pipe end with only a single wall for a predetermined distance. The wall removed from the first pipe end may be either the inner wall or the outer wall. On the second pipe being joined, a portion of the helical rib is removed for a predetermined distance from an end of the second pipe, leaving the inner and outer walls substantially intact. By removing substantially all of the helical rib adjacent the pipe end, the inner and outer walls adjacent the second pipe end are radially more flexible. This allows the circumference of the inner wall at the second pipe end to be increased or the circumference of the exterior wall at the second pipe end to be decreased, thereby allowing the second pipe end to be coupled to the first pipe end. The amount of the helical rib removed from between the inner and outer walls of the second pipe end can be decreased as the distance from the second pipe end increases, however, such a decrease is not necessary. Additionally, cutting a plurality of longitudinal notches through either the inner or outer wall of the second pipe, extending from the second pipe end, facilitates radial deflection of such a wall.

In a first embodiment, where substantially all of the inner wall and helical rib are removed from the first pipe end, the second pipe end is coupled to the first pipe end by positioning the second pipe end (having a portion of helical rib removed therefrom) into the first pipe end (having substantially only the outer wall remaining) in a manner that provides the coupling with substantially flush interior and exterior surfaces. In a second embodiment of the invention, where substantially all of the outer wall and helical rib are removed from the first pipe, the second pipe end is coupled to the first pipe end by positioning the first pipe end (having substantially only the inner wall remaining) within the second pipe end (having a portion of helical rib removed therefrom), in a manner that provides the coupling with substantially flush interior and exterior surfaces. In the first embodiment, corresponding surfaces of the outer walls of the two pipe ends are mated together to form the coupling. In the second embodiment, corresponding surfaces of the inner walls of the two pipe ends are mated together to form the coupling.

In order to fuse the two pipe ends together, an electrical resistance element can be positioned within the coupling to provide means to fusion weld the pipe ends together. The element is disposed on an appropriate mating surface of one of the pipes, depending on which embodiment of the invention is used, and is energized after joining the pipes together to provide the heat necessary to fusion weld the pipes together to form a weld assembly.

As disclosed in the parent application, the electrical resistance element can comprise a stainless steel screen heating element. The use of a one-piece screen as an electrical resistance element allows complete coverage of the required heating area without the potential to electrically short due to movement of wires or loss of insulation and such screens may be considerably less expensive than other resistance heating methods. Furthermore, electrical shorting can be prevented by separating the element ends radially with a piece of non-conductive material, preferably by using a thin piece of thermoplastic material. The sheet of thermoplastic material is preferably of the same material as the pipes and enhances both the coupling process and the fusion welding of the pipe joint. Although only a portion of thermoplastic sheet positioned between the overlapping ends of the element is needed to prevent a short, using a thermoplastic sheet disposed around the entire length of the electrical resistance element facilitates the coupling of the pipe ends and results in an enhanced bond at the weld assembly.

For example, rather than shaping the two ends of the electrical resistance element to avoid overlap, use of the thermoplastic sheet allows use of an electrical resistance element having a length greater than the circumference of the pipe about which it is to be wrapped. In use, the electrical resistance element is wrapped around the pipe and a thin sheet of polyethylene is placed radially between the opposite ends of the element, thereby insulating the opposite ends and preventing a potential electrical short. When the electrical resistance element is energized, the entire screen element causes the surrounding thermoplastic pipe and polyethylene sheet to heat up, melt, and fuse together. During the fusion process, the thermoplastic sheet, in addition to preventing the screen from shortening, increases the amount of thermoplastic material available for forming the bond.

While a screen heating element can be utilized to fuse the pipes, building on the invention, the inventor has discovered that it is preferable to use one or more thermoplastic coated twisted wire heating elements when joining profile wall pipe without a separate coupler.

While the principal advantages and features of the invention have been described above, a greater understanding of the invention may be attained by referring to the drawings and the description of the embodiments which follow.

DETAILED DESCRIPTION OF THE INVENTION

Figure 1:
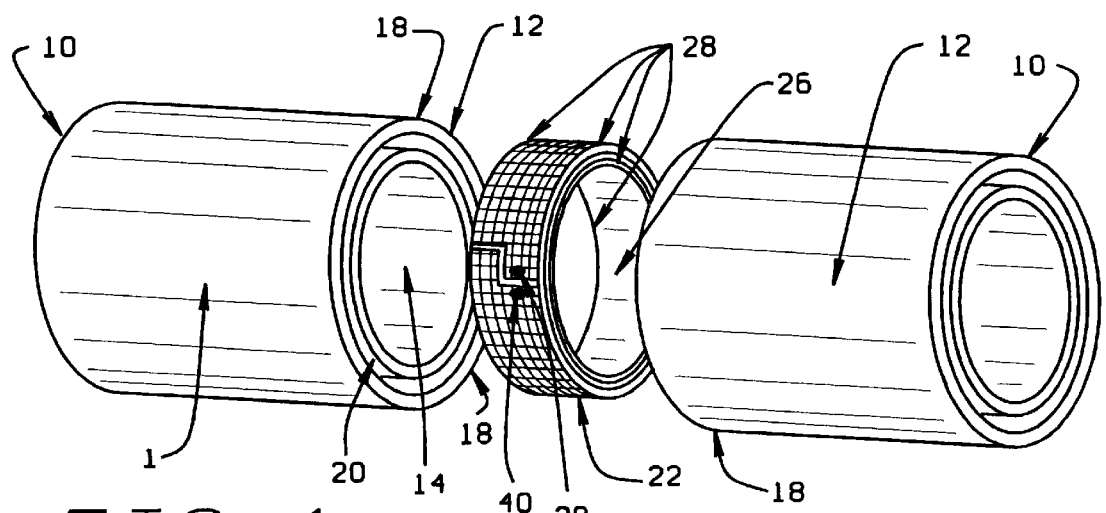
FIG. 1 is an oblique view of two square profile wall pipes showing a coupler between the two pipes prior to joining the pipes.

An embodiment of the invention is shown in FIG. 1. Identical profile wall pipes 10 are shown. Because the pipes of this embodiment are identical, only one pipe will be described in detail, however, it is understood that the detailed description of the pipe of this embodiment applies equally to each pipe unless otherwise specified. Profile wall pipes 10 comprise a generally cylindrical outer wall 12, a cylindrical inner wall 14 substantially concentric with outer wall 12, and a helical rib 16 extending between the walls 12, 14 that connects the walls 12, 14 together. The convolutions of the rib 16 extend between the exterior of the inner wall 14 and the interior of the outer wall 12 for substantially the entire axial length of each pipe 10, with each turn of rib 16 representing 360 degrees of angular extension of rib 16 about the longitudinal axis of pipe 10. The rib 16 advances incrementally along the longitudinal axis of pipe 10 as it winds around pipe 10 and thereby forms a profile space 11 between each wind of the rib 16 around the pipe 10. Both the outer wall 12 and the inner wall 14 terminate at an end wall 18.

The profile wall pipe 10 is comprised of polyethylene and is manufactured by extrusion so that each length of pipe is one integral piece of material. Outer wall 12, inner wall 14, and rib 16 all extend the full length of pipe 10. Outer wall 12 and inner wall 14 have relatively smooth surfaces and terminate at end wall 18. Rib 16 does not end flush with the plane of the end wall 18 for the entire circumference of pipe 10 because the helical rib 16 advances incrementally along the longitudinal axis of pipe 10 with each turn around pipe 10. As a result, the majority of the circumference of the end wall 18 is open to the profile space 11.

Figure 2:
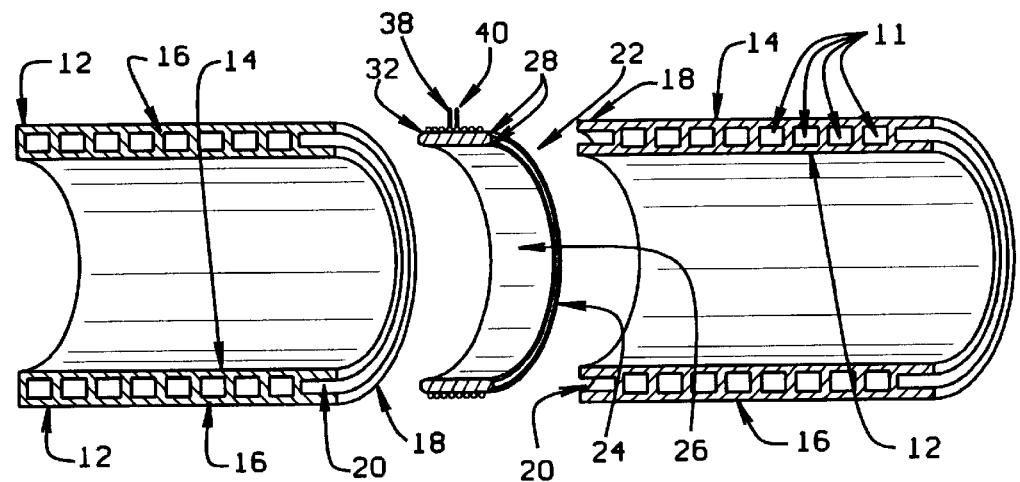
FIG. 2 is a cross-sectional oblique view of the two square profile wall pipes and coupler of FIG. 1.
Figure 10:
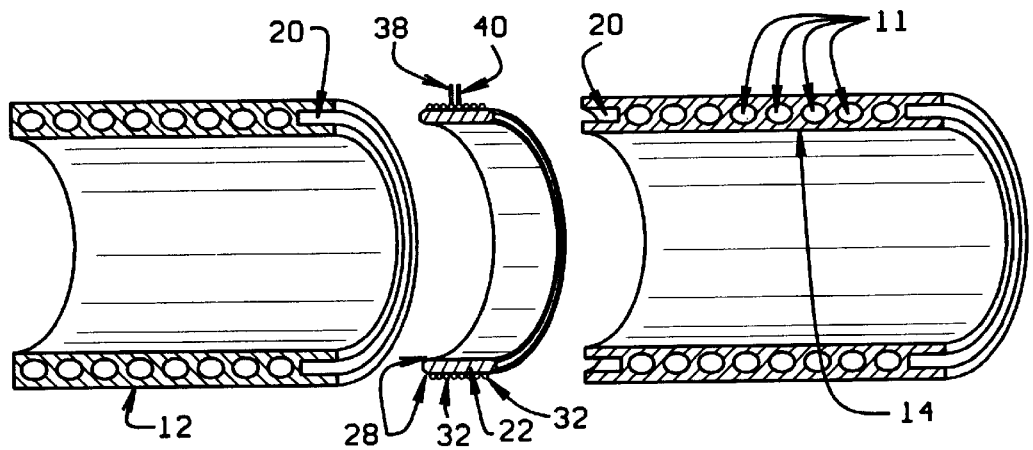
FIG. 10 is a cross-sectional oblique view of two round profile wall pipes prior to being joined, with a coupler therebetween.

Profile space 11 is formed during the manufacture of profile wall pipe 10 and bordered on the exterior by outer wall 12, on the interior by inner wall 14, and on each side by rib 16. Profile space 11 can be square, as shown in FIG. 2 or round, as shown in FIG. 10, depending on the extrusion process. Any shape of profile space is acceptable for the present invention.

Referring to FIG. 2, rib 16 advances along the longitudinal axis of pipe 10 as it traverses the length of pipe 10 and connects outer wall 12 and inner wall 14. In profile wall pipes, the depth of profile space at an end of pipe 10, measured from the plane of end wall 18, increases along the circumference of end wall 18. The amount of increase in the depth of the profile space is a function of the longitudinal advance of rib 16 with each turn around pipe 10.

Shown in FIG. 2, end wall 18 of pipe 10 has a channel 20 formed therein for receiving coupler 22. Channel 20 is formed by removing a portion of rib 16 between outer wall 12 and inner wall 14. The amount of the rib 16 removed depends upon the desired depth of channel 20. The depth of channel 20 must be equal to or greater than a pre-determined value which is dependent upon the size of the coupler 22 as described below. The depth of the channel 20 must equal or exceed the pre-determined depth for the entire circumstance of the end wall 18.

Figure 3:
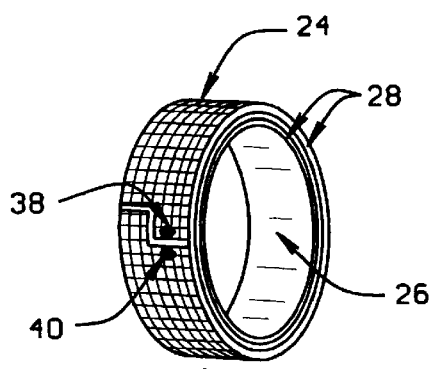
FIG. 3 is a oblique view of the coupler with an electrical resistance element placed thereon.
Figure 4:
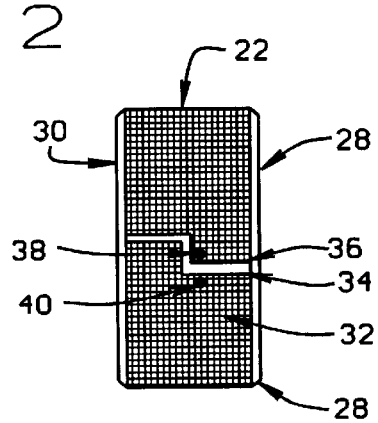
FIG. 4 is a side view of the coupler of FIG. 3.

Coupler 22, shown in FIG. 3, is an annular ring having an exterior surface 24 and an interior surface 26. Coupler 22 is configured with an inside diameter and an outside diameter to allow insertion of coupler 22 into channel 20. However, the configuration of coupler 22 must also allow mating of coupler exterior surface 24 with outer wall 12 of each pipe 10 and mating of coupler exterior surface with inner wall 14 of each pipe 10. Referring to FIG. 4, coupler 22 has an axial width, measured from edge 28 to edge 30, which is determined by the diameter of the pipe to be joined. The depth of channel 20 (FIG. 2) must be equal to or greater than one-half the width of coupler 22. Coupler 22 has a thickness, measured from exterior surface 24 to interior surface 26, which is approximately equal to the distance between inner wall 14 and outer wall 12 of each pipe 10 to allow for a 10 slight interference fit of coupler 22 within channel 20 of each pipe. The edges 28 and 30 of coupler 22 are beveled or chamfered to facilitate insertion into channel 20.

Figure 5:
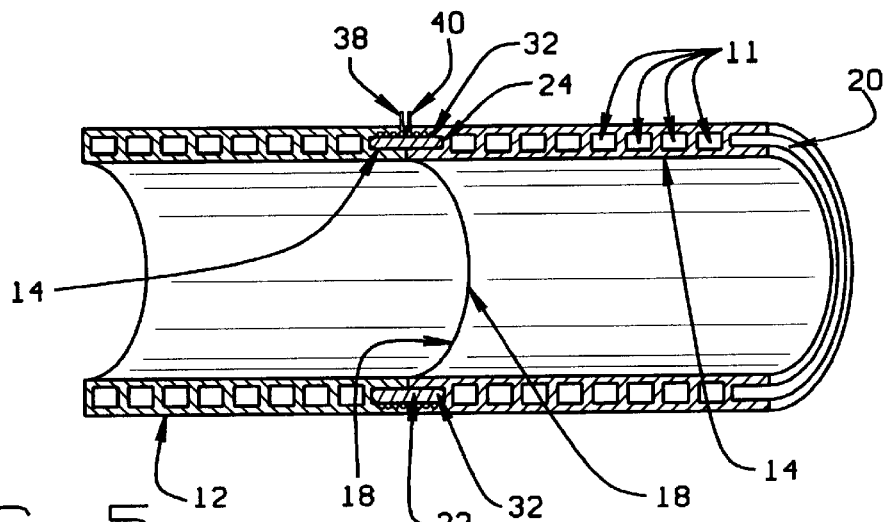
FIG. 5 is a cross-sectional oblique view of two square profile wall pipes united, end to end, with a coupler in the channel of each pipe.

Referring to FIG. 5, upon insertion of coupler 22 into channel 20 of each pipe 10, the end walls 18 of the pipes 10 should abut against one another to allow for a substantial flush pipe joint with a substantially continuous and flush inner wall and a substantially flush and continuous outer wall. As set forth above, a pipe joint with substantially flush inner and outer walls provides for a pipe joint which will not impede the fluid flow through the pipe nor impede insertion of the joined pipes into an existing culvert. Thus, the invention allows the entire length of joined pipe to have a substantially uniform outside diameter and inside diameter which is not available in the prior art.

Two 10" inside diameter profile wall pipes can be joined using a coupler having a width of approximately 3". This allows a sufficient amount of mating surface to create a strong, uniform, and water-tight joint. The 3" coupler requires a channel with a depth of at least 1.5" in each pipe for receiving the coupler. As a diameter of the pipes to be joined increases, the size and width of the coupler also increases. For example, to join two 42" inside diameter pipes would require a coupler with approximately an 8" width.

The thickness of the coupler is determined by the "profile" distance (the radial distance between the inner wall and the outer wall) of the pipes to be joined. For example, one manufacturer produces a polyethylene pipe with a 10" inside diameter and an outside diameter of approximately 11.20". The inner and outer wall thicknesses of this particular profile wall pipe range between 0.065" to 0.079". Therefore, this particular pipe has a profile distance of approximately 0.5" calculated by subtracting the sum of one-half of the inside diameter plus the inner and outer wall thicknesses from one-half the outside diameter. A 36" inside diameter profile wall pipe from the same manufacturer has a wall thickness of approximately 0.195" to 0.228" and an outside diameter of approximately 40.65", resulting in a profile distance between the inner and outer walls of approximately 2".

Figure 6:
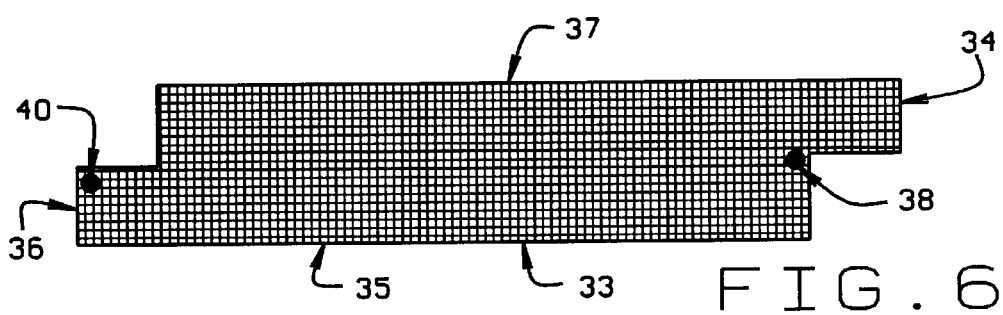
FIG. 6 shows a flattened electrical resistance element screen prior to attachment to a coupler.

Coupler 22 includes an electrical resistance element 32, shown in FIG. 5, to provide the heat required to fuse coupler 22 to the inner wall 14 and outer wall 12 of pipes 10. The electrical resistance element shown in FIG. 6 is a stainless steel screen 33. Screen 33 has ends 34 and 36 with terminal pins 38 and 40 electrically connected thereto. Screen 33 also has a length, measured from end 34 to end 36 and a width, measured from side 35 to side 37, sufficient to cover the exterior surface 24 of coupler 22.

Figure 7:
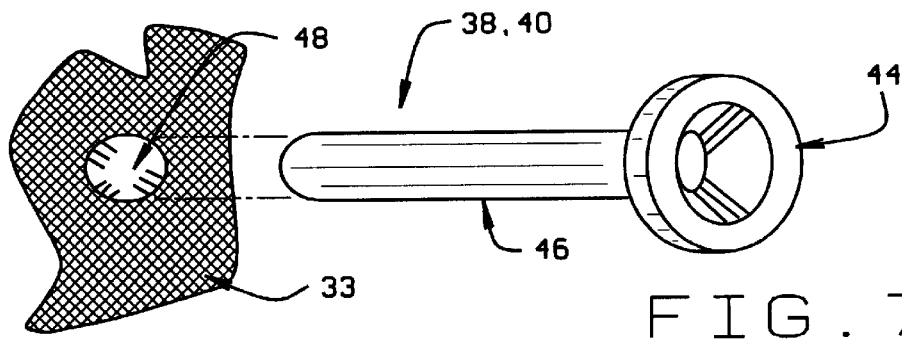
FIG. 7 is an oblique view of a terminal pin and a partial view of an electrical resistance element screen before insertion of the terminal pin into the screen.

Ends 34 and 36 are configured to allow overlap of end 34 with end 36 around the circumference of the coupler 22 without making contact therebetween. This prevents electrical shorting of the electrical resistance element 32 when it is energized and allows for uniform heating over entire exterior surface 24 of coupler 22. Terminal pins 38 and 40 are located at opposite ends of the screen 33 to provide for electrical connection of a power source (not shown) to screen 33 for energization of screen 33. Terminal pins 38 and 40 are electrically connected to electrical resistance element 32. Terminal pins 38 and 40, shown in FIG. 7 before attachment to screen 33, have a base 44 and an extension 46. Base 44 has a larger circumference than extension 46 to allow extension 46 to be inserted in an opening of screen 33 without pulling base 44 through opening 48. Terminal pins 38 and 40 may be made of any type of electrically conductive material such as copper or stainless steel but must be of sufficient gauge to allow transfer of enough electrical current to the electrical resistance element 32 as required to fuse the coupler 22 to channel 20.

Referring to FIG. 4, terminal pins 38 and 40 are attached to ends 34 and 36 of the screen 33 and are aligned with the center of coupler 22, equidistant from sides 35 and 37, when screen 33 is wrapped around coupler 22. Terminal pins 38 and 40 are positioned in this fashion to protrude between abutted end walls 18 of pipes 10 to allow electrical connection of screen 33 in channel 20 to an external power source (not shown).

To energize screen 33, the power source (not shown) is connected to terminal pins 38 and 40 of screen 33 by connecting the positive lead from the power source to one terminal, for example 38, and the negative lead from the power source to the second terminal, for example 40. As electrical current is run through screen 33, the screen dissipates heat to coupler 22 and pipes 10. Referring to FIG. 5, after coupler 22 is inserted into channel 20, terminal pins 38 and 40 are connected to a power source (not shown), as described above, which supplies a predetermined amount of electrical current sufficient to heat electrical resistance element 32 and soften coupler 22 and the appropriate mating surface of the pipes. The interference fit between coupler 22 and pipe develops sufficient bonding pressure as coupler 22 softens and expands causing pressure between the inner wall 14 and outer wall 12. Inner wall 14 and outer wall 12 also are heated from energization of electrical resistance element 32 and this produces a uniform and strong fusion bond between coupler 22 and pipes 10.

Electrical resistance element 32 is embedded into the exterior surface 24 of coupler 22. The electrical resistance element can also be attached to the interior surface 26 of coupler 22. In the alternative, electrical resistance element 32 can be embedded in inner wall 14 or outer wall 12 of the pipes. The exact location of electrical resistance element 32 is not critical as long as it is within sufficient proximity to both the coupler 22 and at least one pipe wall 12 or 14 so that upon energization of electrical resistance element 32, coupler 22 will fuse to pipes 10.

Electrical resistance element 32 is comprised of stainless steel screen 33. However, any electrically conductive material, such as wire, screen, mesh, or helical resistance wire is acceptable provided upon energization it produces sufficient heat to fuse coupler 22 within channel 20 of each pipe. The use of screen 33 decreases the likelihood of an electrical short as often occurs with an electrical resistance element made of a single wire.

Figure 8:
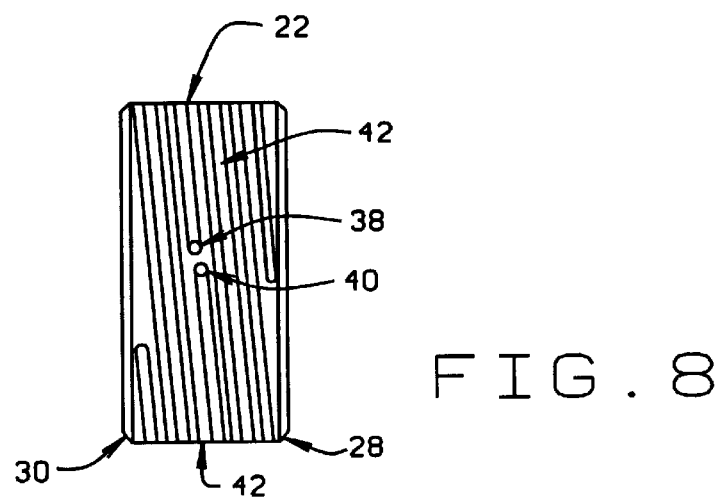
FIG. 8 is a side view of a coupler with an electrical resistance element in the form of a helical wire wound around the coupler.

For example, as shown in FIG. 8, electrical resistance element is formed by wrapping a single wire 42 in successive turns around coupler 22 toward each edge 28 and 30. During insertion of coupler 22 into channel 20, due to the required interference fit, one turn of single wire 42 could be forced into an adjacent turn of wire, thereby shorting the circuit and preventing electricity from conducting past the short. This would result in only a portion of coupler 22 being fused to the pipes.

Electrical resistance element 32 is embedded into the exterior surface 24 of coupler 22. When using a coupler, it is preferred that electrical resistance element 32 be sufficiently affixed to the coupler 22 to prevent the electrical resistance element 32 from moving during the insertion of the coupler 22 into the channel 20 due to the interference fit between coupler 22 and channel 20. If a stronger joint is desired, a second electrical resistance element can be added to the interior surface 26 of coupler 22. Proper placement of electrical resistance element 32 in channel 20 provides for a continuous and uniform fusion weld at the joint.

Coupler 22 can be manufactured with electrical resistance element 32 embedded therein or the embedding can be accomplished in the field. In the manufacturing process, electrical resistance element 32 can be embedded using techniques known in the art currently used for manufacturing electrofusion collars or inserts. In the alternative, electrical resistance element 32 can be placed around the coupler 22 and covered with a like thermoplastic material. If electrical resistance element 32 is to be attached to inner wall 14 or outer wall 12 of pipe 10, the same techniques can be used when manufacturing the pipes to attach electrical resistance element in channel 20.

In the field, electrical resistance element 32 can be embedded into exterior surface 24 of coupler 22 by wrapping electrical resistance element 32 around coupler 22 and applying pressure to urge it into the exterior surface of coupler 22 while energizing electrical resistance element 32. The pressure can be applied using a clamp (not shown), or a binder (not shown) which can be shaped around coupler 22 and electrical resistance element 32.

FIG. 5 is a cross sectional view showing coupler 22 inserted in channel 20 joining the pipes 10 prior to energization of electrical resistance element 32. As is shown, end walls 18 of pipes 10 are abutting against one another and the exterior surface 24 of coupler 22 is adjacent the outer walls 12 of pipes 10. The interior surface 26 of the coupler 22 is adjacent the inner walls 14 of pipes 10. Electrofusion element 32 is positioned between exterior surface 24 and outer walls 12 of pipes 10. Terminal pins 38 and 40 extend between abutted end walls 18 to allow connection to power source (not shown). Any power source capable of supplying adequate power to the electrical resistance element is acceptable for the present invention. For example, a variable current electrical welder is acceptable as are any type of power supplies used in the prior art for fusion welding of thermoplastic pipes using electrofusion collars and inserts. Preferably, an electrofusion control unit is used for the power source, as are known in the art, to furnish a predetermined amount of electrical current which is required to heat the screen 33 and partially melt exterior surface 24 of coupler 22 and inner wall 14 and outer wall 12 of pipes 10.

The coupler 22 expands during heating at a greater rate than the pipe walls due to the attachment of the electrical resistance element thereon. This develops additional internal bonding pressure to produce a fusion bond of adequate depth and continuity to form a pressure tight pipe joint, that is substantially flush with the pipe walls, leaving no interior flow restrictions or exterior collars or obstructions.

A variety of power sources exist in the art which will supply the correct amount of current for each pipe size. Existing electrofusion control units are capable of measuring heat levels and/or maintaining a measured welding time at a predetermined current to form a structurally sound leakproof joint upon cooling. However any experienced fusion welder with charts showing the recommended current and heating time for each size and composition of pipe, is capable of forming a leak-proof joint using any available, variable ampere, direct current welder, as a power source.

Figure 9:
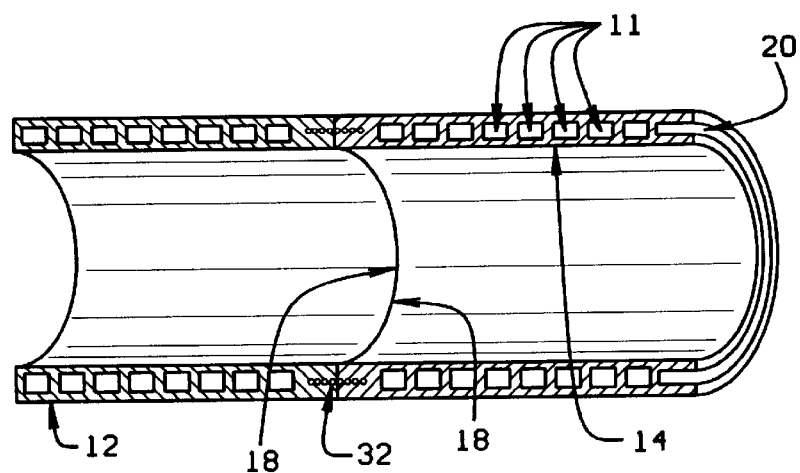
FIG. 9 is a cross-sectional oblique view of two square profile wall pipes and a coupler after being electrofusion welded.

FIG. 9 shows a complete joint using the invention after screen 33 has been energized and the fusion weld is complete. As is shown, it results in a substantially flush joint on both its interior and exterior and a substantially uniform outside diameter and inside diameter throughout the length of the joined pipes.

Figure 11:
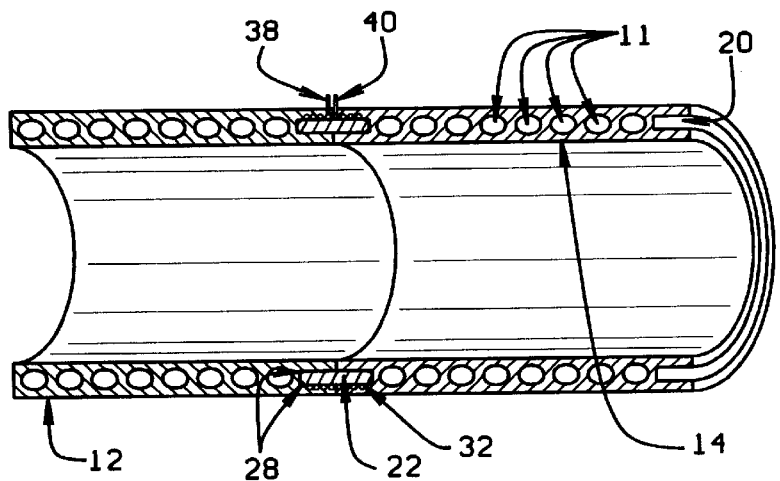
FIG. 11 is a cross-sectional oblique view of two round profile wall pipes showing a coupler in the channel of each pipe prior to being electrofusion welded.
Figure 12:
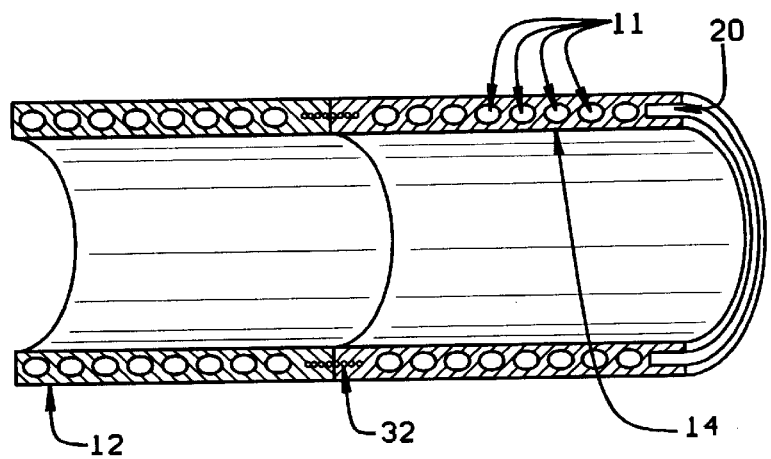
FIG. 12 is a cross-sectional oblique view of two round profile wall pipe sections after being joined and electrofusion welded.

FIGS. 10 through 12, show an embodiment of the invention used on profile wall pipe having a round rather than square shaped profile space 11. The detailed description above is equally applicable to round profile wall pipe as discussed above with like numbers referring to like elements.

Having described the apparatus above, a method for forming the pipe joint between two pipes is explained. As noted above, this embodiment is particularly adapted for use with profile wall pipe, and produces a pipe joint with substantially flush exterior and interior surfaces. This method is equally applicable to solid wall thermoplastic pipe having a sufficient wall thickness to allow the formation of channel 20 between the inner wall 14 and the outer wall 12. The method will be explained assuming profile wall pipe, however, the only requirement for the invention is that the pipe be capable of having a channel 20 at an end wall 18 for receiving a coupler 22 therein.

To practice the method of using the coupler 22, pipes 10 are modified to include a channel 20 in each end wall 18. This can be performed by routing or machining taking care not to remove inner wall 14 or outer wall 12 in the process. In profile wall pipe, the creation of channel 20 is made simpler by the lack of a solid wall at end walls 18. As stated above, profile wall pipe is manufactured having a profile space 11 formed by inner wall 14, outer wall 12, and rib 16.

Therefore, at the end wall 18 of a section of profile wall pipe 10, profile space 11 already exists prior to routing. However, removal of rib 16 is required in order to form channel 20 with a minimum depth the entire circumference of end wall 18.

The amount of rib 16 which must be removed is dependent upon the depth of channel 20 required, the size of rib 16, and the width of profile space 11. It is preferable to have the depth of channel 20 uniform, however, all that is required is that the shallowest segment of channel 20 be greater than or equal to one-half the width of coupler 22. After channel 20 is formed in end walls 18 of pipes 10, the coupler can be inserted into the channel.

Edges 28 and 30 of the coupler 22 are beveled to facilitate insertion of coupler 22 into the channel 20. The electrical resistance element 32 is preferably embedded into the exterior surface 24 of the coupler 22. If electrical resistance element 32 is not attached to coupler 22, this must be accomplished prior to insertion of coupler into pipe 20. An electrical resistance element, such as screen 33 is wrapped around exterior surface 24 of coupler 22. A clamp (not shown) or adjustable binder (not shown) is tightened over screen 33 urging screen 33 onto coupler 22. Terminal pins 38 and 40 should be aligned in the center of coupler 22 equidistant from edges 28 and 30. This allows the extension of terminal pins 38 and 40 to extend between abutment of end walls 18 after coupler 22 is inserted into channel 20 of each pipe 10 to be joined. To embed screen 33 into exterior surface 24 of coupler 22, a power source (not shown) is electrically connected to terminal pins 38 and 40. A positive lead is attached to one terminal, for example 38, and a negative lead from power source is attached to other terminal pin, for example 40. Screen 33 is then energized by power source (not shown) causing electrical current to flow through screen 33. Screen 33 should be energized long enough to attach screen 33 sufficiently to coupler 22 to hold screen 33 in place during insertion of coupler 22 into channel 20. The screen 33 is energized until coupler 22 begins to protrude through openings in screen 33.

After attachment of screen 33 to coupler 22, coupler 22 is inserted into channel 20 of each the pipes 10. Coupler 22 is preferably inserted to a depth of one-half of its width into each pipe 10. This allows for abutment of end walls 18 of each pipe 10 and provides a mating surface between coupler 22 and each pipe 10.

After coupler 22 is inserted into channel 20 of each pipe 10, screen 33 is energized, as described above by connecting power source to terminal pins 38 and 40. Screen 33 should be energized for a sufficient duration to cause pipes 10 to be fusion welded to coupler 22. The amount of power and duration are determined by the types of thermoplastic material from which pipes 10 are made and the amount of heat necessary to create the fusion weld. As stated above, the amount of heat and power necessary is known in the art of electrofusion welding using electrofusion couplers and inserts.

Another embodiment of the invention for use on solid wall thermoplastic pipes is shown in FIGS. 13–17. A first solid wall pipe 50 and a second solid wall pipe 52 can be joined using the principles of the invention by modifying a first pipe end 54 and a second pipe end 56 for use with electrical resistance element 32. This embodiment creates a substantially flush interior and exterior pipe joint and a substantially uniform outside diameter and inside diameter. As shown, first pipe 50 and second pipe 52 have substantially equal outside diameters, substantially equal inside diameters and each has a substantially uniform circumference. First end 54 and second end 56 have substantially the same inside diameter and outside diameter as pipes 50 and 52.

The outside diameter of first end 54 is machined or shaved to form a male nipple 58. In order to allow for a pipe joint having a substantially flush interior and substantially flush exterior, nipple 58 is formed by decreasing outside diameter of first end 54 and thereby decreasing the wall thickness. At one end of nipple 58 is shoulder 61 where the nipple 58 meets the remainder of first pipe 50 and that is formed by the difference in outside diameter between nipple 58 and first pipe 50. At the other end of nipple is nipple edge 60 which can be beveled or chamfered. Between nipple edge 60 and shoulder 61 is nipple exterior surface 74.

Figure 14:
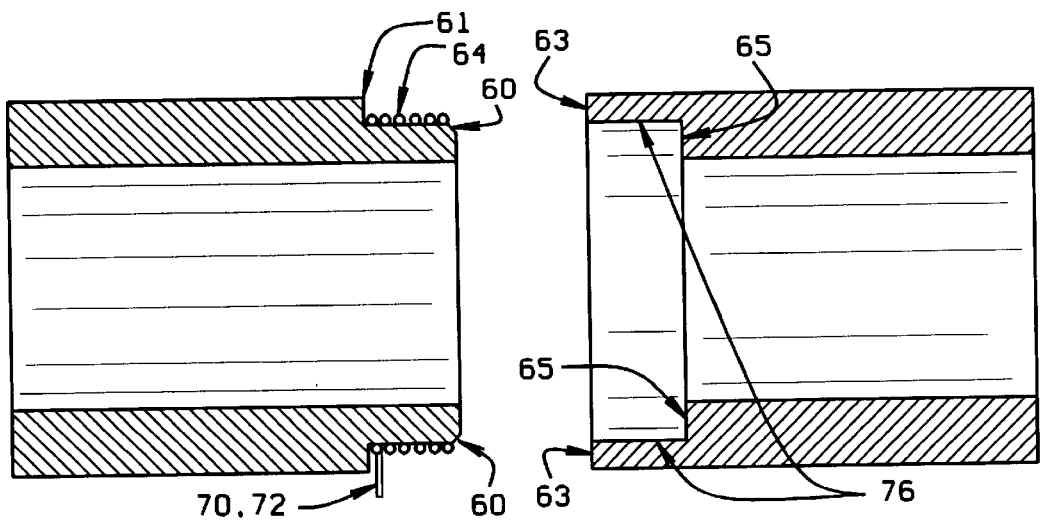
FIG. 14 is a cross-sectional side view of two solid wall thermoplastic pipes adjacent to each other with the inside wall of one pipe having a nipple and the other pipe having a socket.

The inside diameter of second end 56 is machined or shaved to form a female socket 62. In order to allow for a pipe joint having a substantially flush interior and substantially flush exterior, socket 62 is formed by increasing the inside diameter of second end 56 and thereby decreasing the wall thickness. Referring to FIG. 14, at one end of socket 62 is end wall 63 of second pipe 52 and at the other end of socket is lip 65 formed by the difference in inside diameter between second pipe 52 and socket 62. Between lip 65 and end wall 63 is socket interior surface 76.

It is preferable that the wall thickness of both first end 54 and second end 56 are decreased by approximately one-half of the original wall thickness. As such, the amount of decrease in wall thickness (and increase in inside diameter) of second end 56 is approximately equal to the decrease in wall thickness (and decrease in outside diameter) of first end 54.

Figure 15:
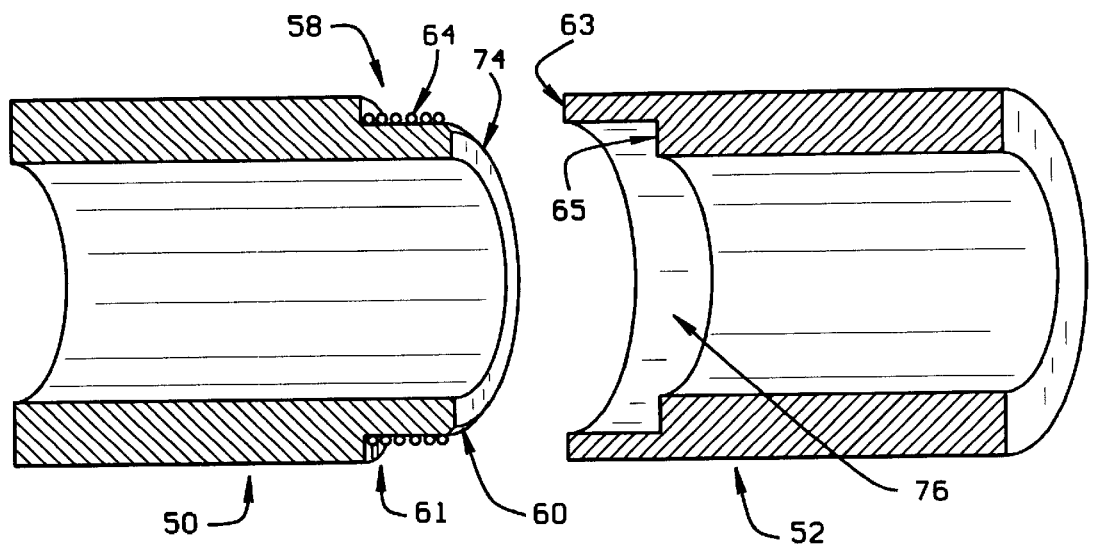
FIG. 15 is a cross-sectional oblique view of two solid wall thermoplastic pipes adjacent to each other with the inside wall of one pipe having a nipple and the other pipe having a socket.

Referring to FIG. 15, the length of nipple 58, measured from shoulder 61 to the nipple edge 60, is equal to the depth of socket 62, measured from end wall 63 to lip 65. This allows the nipple 58 to have an interference fit within the socket 62 with the exterior surface 74 of the nipple 58 adjacent to interior surface 76 of socket 62, shoulder 61 of first pipe 50 abutted against end wall 63 of second pipe 52, and lip 65 of second pipe 52 abutted against nipple edge 60 of first pipe 50. The resulting joint having a substantially flush interior and exterior and substantially uniform outside and inside diameters.

The nipple 58 has an electrical resistance element 64 embedded into the exterior surface 74 of the nipple. The electrical resistance element 64 is substantially identical to the electrical resistance element 32 of the embodiment discussed above except for the configuration of the ends 66 and 68 and location of the terminal pins 70 and 72. However, the composition and characteristics of the electrical resistance element 64 and the terminal pins 70 and 72 are identical to the electrical resistance element 32 and the terminal pins 38 and 40, respectively. Therefore, the discussion above relate thereto is equally applicable herein.

Figure 13:
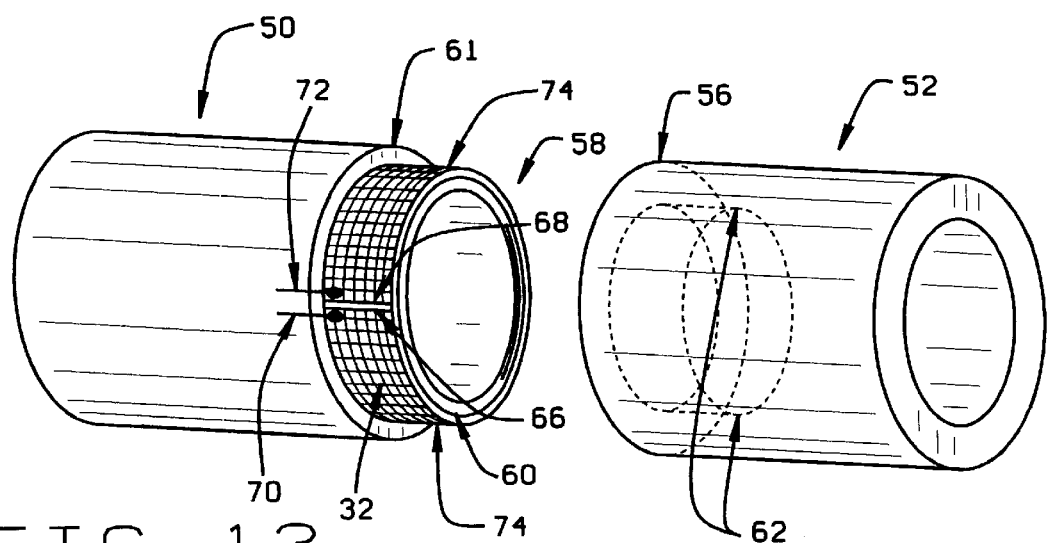
FIG. 13 is an oblique view of two solid wall thermoplastic pipes adjacent to each other with the inside wall of one pipe having a nipple and the other pipe having a socket.

As shown in FIG. 13, the electrical resistance element 64 has a length, measured between the ends 66 and 68, sufficient to substantially cover the exterior surface 74 of the nipple 58 and a width substantially equal to the length of nipple 58. Ends 66 and 68 are cut at the right angle to the length of the electrical resistance element and do not overlap. This allows extension of the terminal pins 70 and 72 between shoulder 61 of the first pipe 50 and the end wall 63 of the second pipe 52 for connection to power source (not shown).

The attachment of electrical resistance element 64 to the exterior surface 74 of the nipple 58 is identical to the attachment of electrical resistance element 32 to exterior surface 24 of coupler 22 described above. In the alternative, electrical resistance element 64 may be attached to interior surface 76 of socket 62. As set forth in detail above, electrical resistance element 64 should be sufficiently close to both the interior surface 74 and the exterior surface 76 to cause fusion of the socket 62 within nipple 58 upon energization of electrical resistance element 64.

Figure 16:
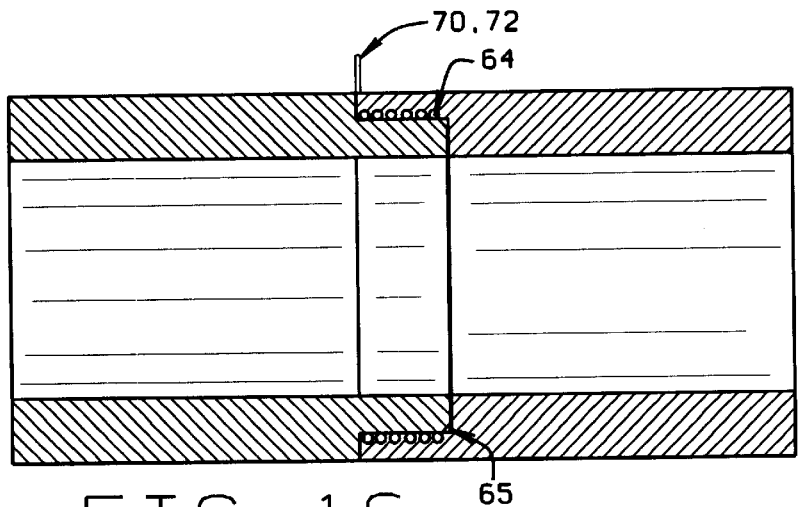
FIG. 16 is a cross-sectional side view of the two solid wall thermoplastic pipe sections of FIG. 15 after insertion of the nipple into the socket.

FIG. 16 shows the nipple 58 inserted within socket 62. As is shown, exterior surface 74 of the nipple 58 is adjacent the interior surface 76 of socket 62. The nipple edge 60 is abutted against the lip 65 and the end wall 63 is abutted against shoulder 61. The electrical resistance element 64 is embedded into the exterior surface 74 of the nipple 58 and is sufficiently close to the interior surface 76 of socket 62 to cause fusion of the nipple 58 to the socket 62 upon energization of the electrical resistance element 64. Terminal pins 70 and 72 extend between the abutted end wall 63 and the shoulder 61 to allow connection to power source (not shown).

Any power source capable of supplying adequate power to the electrical resistance element 64 is acceptable. For example, a variable current electrical welder is acceptable as are any type of power supplies used in the prior art for fusion welding of thermoplastic pipes using electrofusion collars and inserts.

Preferably, an electrofusion control unit is used for the power source, as are known in the art, to furnish a predetermined amount of electrical current which is required to heat the screen 78 and partially melt exterior surface 74 of the nipple 58 and the interior surface 76 of socket 62. The nipple 58 expands during heating at a greater rate than the interior surface 76 of the socket 62 due to the attachment of the electrical resistance element thereon. This develops additional internal bonding pressure to produce a fusion bond of adequate depth and continuity to form a pressure tight pipe joint that is substantially flush with the pipe walls, leaving no interior flow restrictions or exterior collars or obstructions.

A variety of power sources exist in the art which will supply the correct amount of current for each pipe size. Existing electrofusion control units are capable of measuring heat levels and/or maintaining a predetermined current for predetermined welding time to form a structurally sound leak-proof joint upon cooling. However, any experienced fusion welder with charts showing the recommended current and heating time for each size and composition of pipe, is capable of forming a leak-proof joint using any available, variable ampere, direct current welder, as a power source.

Figure 17:
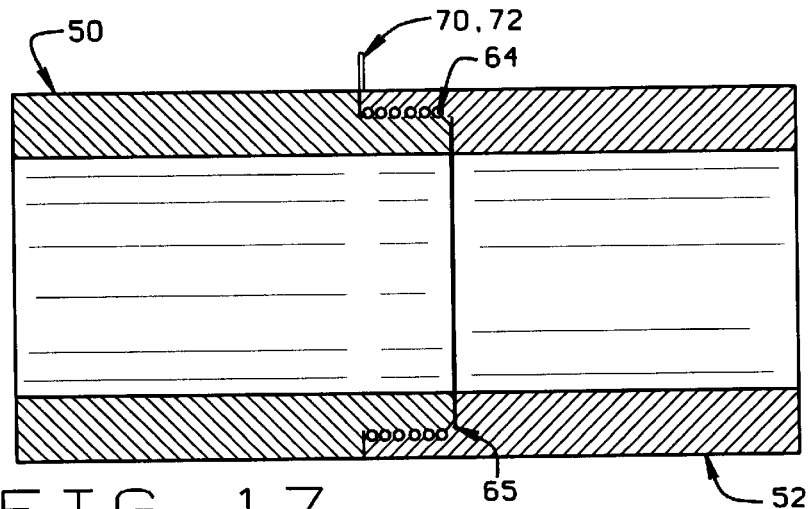
FIG. 17 is a cross-sectional side view of the two solid wall thermoplastic pipe sections of FIG. 16 after electrofusion welding.

FIG. 17 shows a complete joint after screen 78 has been energized and the fusion weld is complete. As is shown, the joint has a substantially flush interior and exterior and a substantially uniform outside diameter and inside diameter throughout the length of the joined pipes.

To practice the method of this embodiment, a first pipe 50 is modified at a first end 54 to form a nipple 58 and a second pipe 52 is modified to form a socket 62 for receiving nipple 58 therein.

First pipe 50 and second pipe 52 have substantially equal outside diameters, substantially equal inside diameters, and each has a substantially uniform circumference. First end 54 and second end 56 have substantially the same inside diameter and outside diameter as pipes 50 and 52.

To form nipple 58, the outside diameter of first end 54 is machined or shaved by decreasing the outside diameter of first end 54 and thereby decreasing the wall thickness. The inside diameter of second end 56 is machined or shaved to form a female socket 62 by increasing inside diameter of second end 56 and thereby decreasing the wall thickness.

The amount of decrease in the wall thickness of second end 56 is approximately equal to the decrease in the wall thickness of first end 54. The length of nipple 58, measured from shoulder 61 to nipple edge 60, is equal to the depth of socket 62, measured from end wall 63 to lip 65. This allows nipple 58 to fit within socket 62 with exterior surface 74 of nipple 58 adjacent to interior surface 76 of socket 62 and shoulder 61 of first pipe 50 to abut against lip 65 of second pipe 52. The resulting joint has a substantially flush interior and exterior and substantially uniform outside and inside diameters.

After forming nipple 58 and socket 62, an electrical resistance element 64 is embedded into the exterior surface 74 of nipple 58. An electrical resistance element, such as screen 78 is wrapped around exterior surface 74 of nipple 58. A clamp (not shown) or adjustable binder (not shown) is tightened over screen 78, drawing screen 78 onto nipple 58. Terminal pins 70 and 72 should be aligned adjacent shoulder 61. This allows the extension of terminal pins 70 and 72 to extend between the abutment of end wall 63 and shoulder 61 after nipple 58 is fully inserted into socket 62.

To embed screen 78 into exterior surface 74 of nipple 78, power source (not shown) is electrically connected to terminal pins 70 and 72. A positive lead is attached to one terminal pin, for example 70, and the negative lead from power source is attached to the other terminal pin, for example pin 72. Screen 78 is then energized by power source (not shown) causing electrical current to flow through screen 78. Screen 78 should be energized long enough to attach screen 78 sufficiently to nipple 58 to hold screen 78 in place during insertion of nipple 58 into socket 62. Screen 78 is energized until nipple 58 begins to protrude through openings in screen 78.

After attachment of screen 78 to nipple 58, nipple 58 is inserted into socket 62. Preferably nipple 58 is fully inserted into socket 62 to allow nipple edge 60 to abut lip 65 and shoulder 61 to abut end wall 63 while providing a mating surface between exterior surface 74 of nipple 58 and interior surface 76 of socket 62.

After nipple 58 of first pipe 50 is inserted into socket 62 of second pipe 52, screen 78 is energized, as described above by connecting power source to terminal pins 70 and 72. Screen 78 should be energized for a duration sufficient to cause nipple 58 to be fusion welded within socket 62. The amount of power and duration are determined by the types of thermoplastic material from which pipes are made and the amount of heat necessary to create the fusion weld. The amount of heat and power necessary is known in the art of electrofusion welding using electrofusion couplers and inserts.

Any power source capable of supplying adequate power to electrical resistance element 64 is acceptable for this embodiment. For example, a variable current electrical welder is acceptable as are any type of power supplies used in the prior art for fusion welding of thermoplastic pipes using electrofusion collars and inserts.

After inserting nipple 58 with electrical resistance element 64 attached thereto into socket 62, a voltage is applied between the terminal pins 70 and 72 to cause a predetermined amount of electrical current to pass through the electrical resistance element 64. As this is done, the thermoplastic material on the nipple 58 softens and expands as it melts into the socket 62 providing additional fusion pressure. Additionally, the socket interior surface 76 softens to fuse the two pipe sections together with adequate depth and uniformity to make a leak free and strong pipe joint with no interior flow obstructions or exterior collar or protrusions. Thus the joint can be formed without using butt fusion machines or line up equipment to apply longitudinal pressure on the joined pipes as was necessary when using prior art methods to join the two pipe sections.

Further embodiments of the invention include a method and apparatus for using joining thermoplastic profile wall pipes without use of a coupler as described above. As explained, profile wall pipe sections cannot be butt fusion welded together and, unlike solid wall pipe, required inserts or collars. This prevented a solid fusion weld with substantially flush interior and exterior surfaces, as is needed in applications explained above, without the use of the coupler of the invention.

Although the coupler described above is a valuable improvement over the prior art, a pipe joint for thermoplastic profile wall pipes having a substantially flush interior and exterior can be made, without the need of a coupler. This can be done by adapting standard profile wall pipe by configuring the ends of the first and second pipe to be joined. However, it should be understood that the pipe ends could be originally configured during manufacture in the manner described without departing from the invention. This adaptation can occur at the manufacturing stage or at a subsequent stage prior to installation. The method of removing the walls and/or rib can be any suitable means as known in the art such as routing, shaving, grinding, cutting or any equivalent means.

Figure 18:
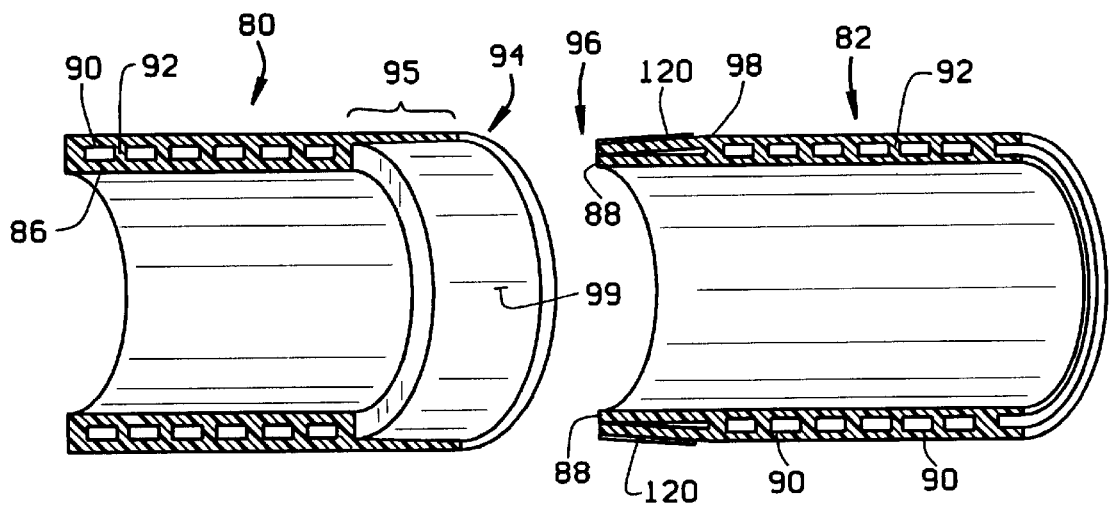
FIG. 18 shows a cross-sectional oblique view of two profile wall pipes and an electrical resistance element, configured in accordance with a first embodiment of the present invention, prior to joining the pipes.
Figure 19:
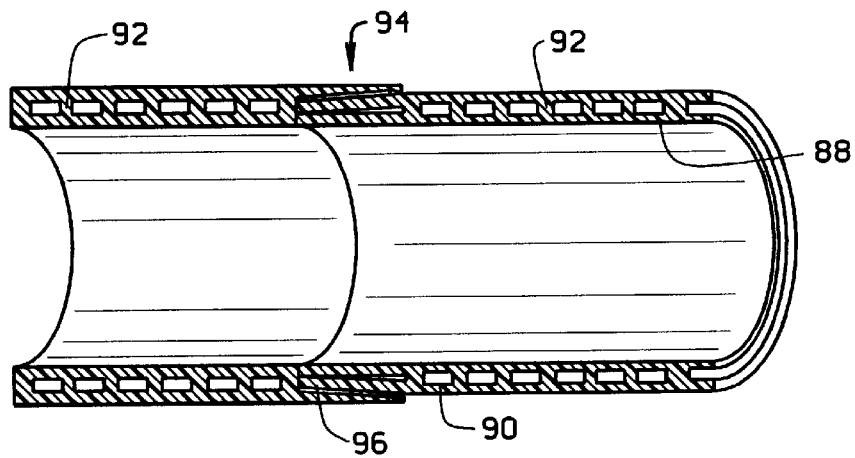
FIG. 19 shows a cross-sectional oblique view of the profile wall pipes of FIG. 18 coupled together with the electrical resistance element in place between mating surfaces of the two pipes, but prior to being fused.
Figure 20:
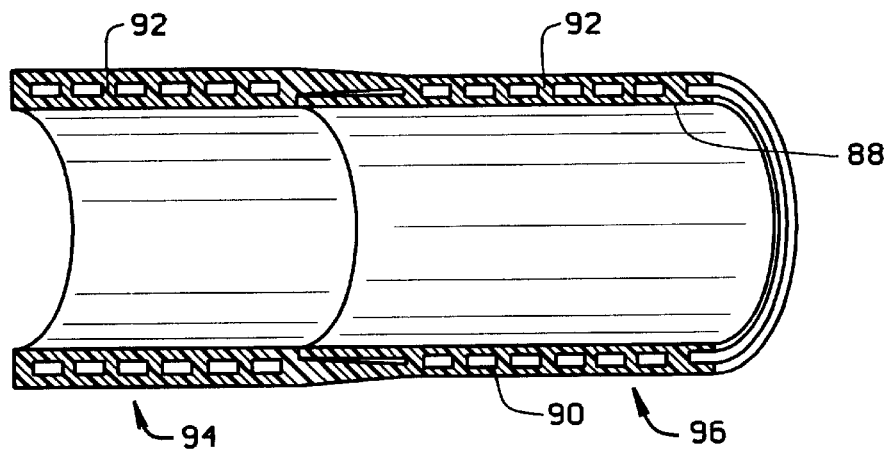
FIG. 20 shows a cross-sectional oblique view of the profile wall pipes of FIG. 18 after being joined and fused, thereby forming a pipe joint having substantially flush interior and exterior surfaces.

In one embodiment of the invention, the profile wall pipes 80 and 82 to be joined are configured or adapted and then coupled and fused together as shown in FIGS. 18–20. As shown in FIG. 18, a first pipe 80 is configured at an end 94 so that substantially all of the inner wall 86 and substantially all of the helical rib 92 are removed for a predetermined distance 95 from the first pipe end 94. The predetermined distance 95 can be varied to provide pipe joints of varying lengths and strengths as desired. In this first embodiment, the second pipe 82 is adapted at an end 96 so that the second pipe end 96 can be coupled with the first pipe end 94 to thereby form an interference fit. As shown in FIG. 18, the second pipe end 96 is configured so that a portion of the helical rib 92 is removed for approximately the predetermined distance from the second pipe end 96, leaving the inner wall 88 and the outer wall 90 substantially intact. The portion of helical rib 92 is removed from the second pipe end for a distance approximately equal to the predetermined distance that the inner wall 86 and helical rib 92 are removed from the first pipe end 94.

Removing a portion of helical rib 92 for the predetermined distance from the second pipe end 96 increases the flexibility of the inner and outer walls 88 and 90 at the second pipe end 96. By decreasing the removed amount of helical rib 92 as the distance from the second pipe end 96 increases, the inner and outer walls 88 and 90 of the second pipe end 96 tend to "knuckle" or pull toward one another. This "knuckling" action tends to decrease the outer diameter of the second pipe at the second pipe end 96 and increase the inner diameter of the second pipe at the second pipe end 96, as compared to these diameters prior to the adaptation. Configured in this manner, the second pipe end 96 can be coupled to the first pipe end 94 by placing the second pipe end 96 within the first pipe end 94. This allows the second pipe end 96 to be coupled with the first pipe end 94, thereby creating an interference fit and providing for a mating surface on each pipe without the need for a coupler. The resulting pipe joint or weld assembly also provides the joint with a substantially flush interior and exterior surface.

Figure 21:
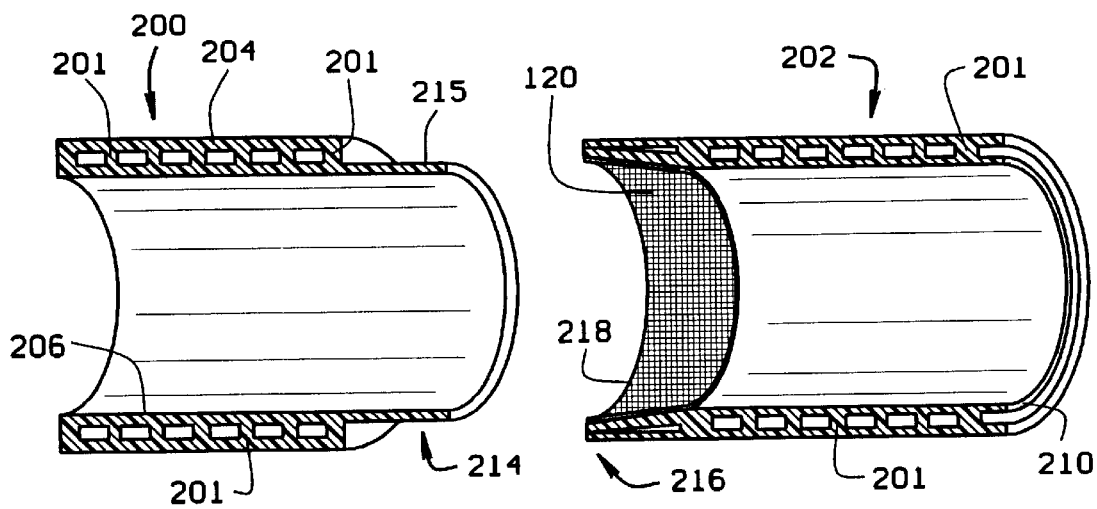
FIG. 21 shows a cross-sectional oblique view of two profile wall pipes and an electrical resistance element, configured in accordance with a second embodiment of the present invention, prior to joining the pipes.
Figure 22:
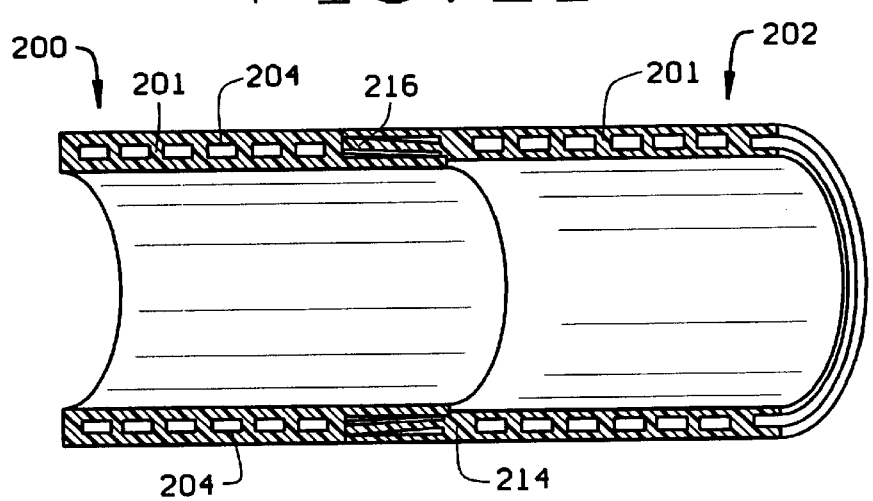
FIG. 22 shows a cross-sectional oblique view of the two profile wall pipes of FIG. 21 coupled together with the electrical resistance element in place between the mating surfaces of the two pipes, but prior to being fused.
Figure 23:
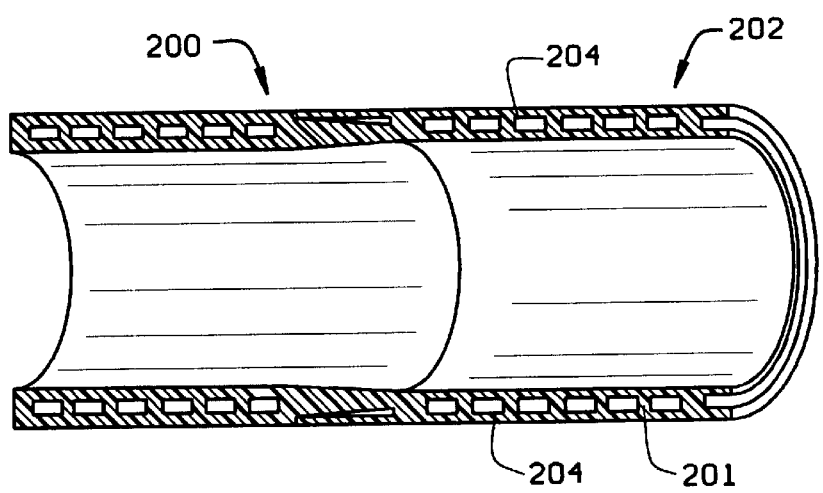
FIG. 23 shows a cross-sectional oblique view of the two profile wall pipes of FIG. 21 after being joined and fused thereby forming a pipe joint having substantially flush interior and exterior surfaces.

In a second embodiment, the two profile wall pipes 200 and 202 to be joined are configured or adapted as shown in FIGS. 21–23. As with the first embodiment, an end of each of the two pipes to be joined must be configured or adapted to provide opposing mating surfaces to allow coupling of the pipes and provide a pipe joint with a substantially flush interior and exterior. In the second embodiment, a first profile wall pipe 200 is configured or adapted so that substantially all of the outer wall 204 and helical rib 201 are removed for a predetermined distance from the first pipe end 214. This predetermined distance can be varied to provide for pipe joints of varying lengths and strengths. As in the first embodiment, the pipe can be adapted in the field or configured during manufacture in accordance with the present invention.

As in the first embodiment, in this second embodiment, an end 216 of the second pipe must be adapted so that the second pipe end 216 can be coupled with the first pipe end 214 to form an interference fit. The second pipe end 216 is adapted as discussed above with respect to the adaptation of the second pipe end 82 in the first embodiment. As in the first embodiment, the helical rib 201 is removed from the second pipe end for a length approximately equal to the distance that the outer wall 204 and helical rib 201 are removed from the first pipe end 214. Configured or adapted in this manner, the second pipe end 216 can then be coupled with the first pipe end 214 by placing the second pipe end 216 around the first pipe end 214, thereby creating an interference fit and providing for a mating surface on each pipe without the need for a coupler. The resulting pipe joint or weld assembly also provides a substantially flush interior and exterior surfaces.

Once the pipes are coupled together, a heating mechanism is required to provide sufficient heat to cause the mating surfaces of the pipe ends to fuse together. Any suitable heating mechanism will work, all that is required is that sufficient heat be provided to cause the pipe ends' mating surfaces to fuse the pipes together. In both of the embodiments of the invention shown herein, the heating mechanism is an electrical resistance element 120 which is placed within the pipe coupling or joint. The electrical resistance element can be anywhere within the pipe joint as long as it provides suitable heat to cause the pipe ends to fuse together. The pipes can be manufactured having the electrical resistance element in place or the element can be added at the time of installation as explained above in regard to the coupling and as further explained below. In both embodiments discussed above, the electrical resistance element 120 is a screen as shown in FIGS. 18–23. If the electrical resistance element 120 is affixed after the pipes are manufactured, the element 120 should be affixed onto the appropriate mating surface prior to coupling the pipe ends.

In the embodiment of the invention, shown in FIGS. 18–20, the electrical resistance element 120 can be fixed to the interior mating surface 99 of the outer wall 84 of the first pipe end 94 or on an exterior surface 98 of the second pipe end 96. In the second embodiment, shown in FIGS. 20–23, the electrical resistance element 120 can be placed on an exterior surface 215 of the interior wall at first pipe end 214 or on an interior surface 218 of the inner wall of the second pipe end 216, as shown in FIG. 21. Once coupled, the element is energized as explained below.

By configuring two standard thermoplastic profile wall pipes in either of the above-described embodiments, each pipe will thereupon be ready for coupling and then fusing to form a single length of thermoplastic profile wall piping having substantially flush interior and exterior surfaces.

Figure 24:
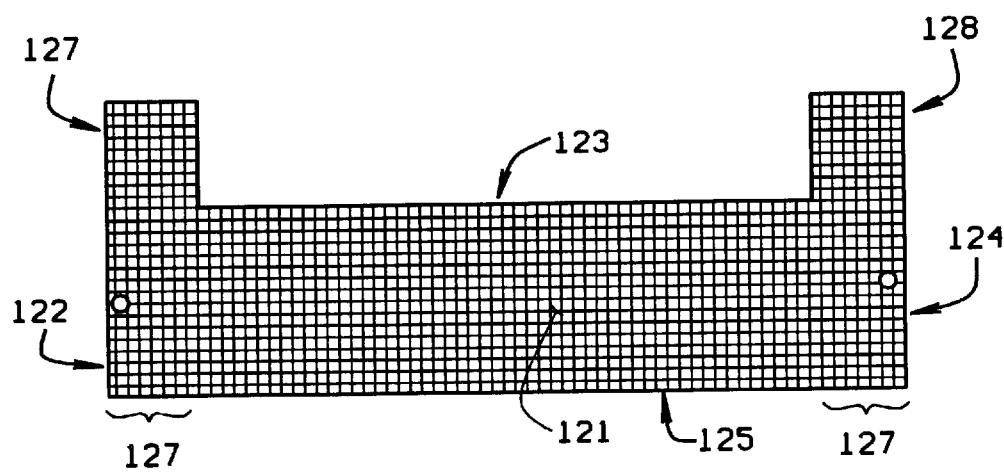
FIG. 24 shows a flattened screen type electrical resistance element by itself.
Figure 25:
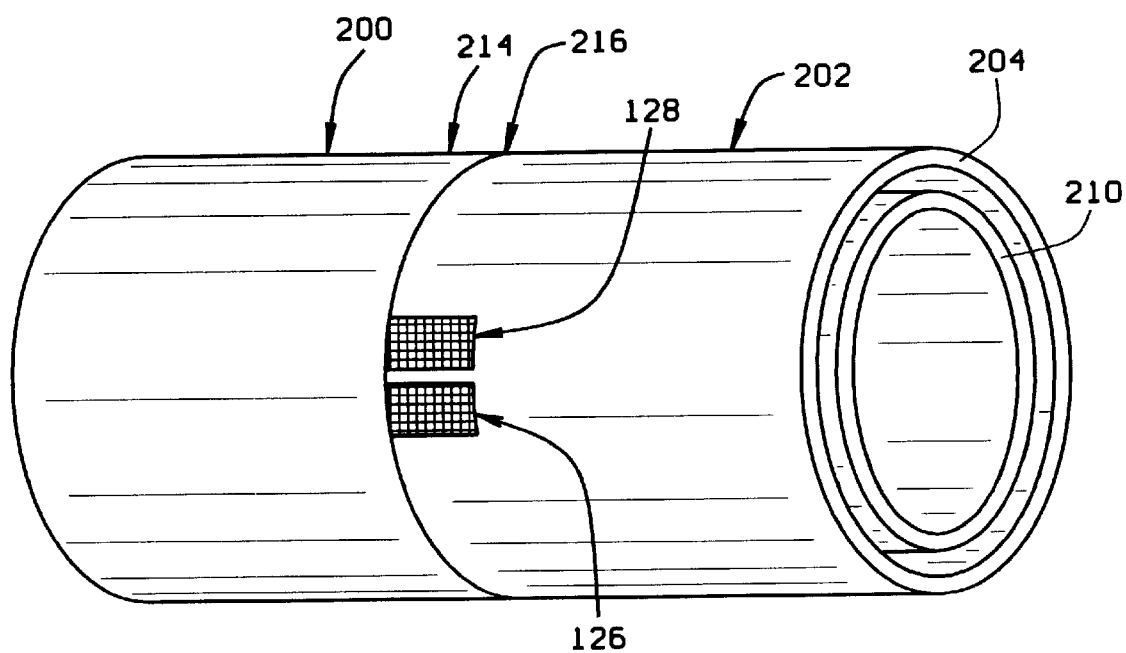
FIG. 25 shows an oblique view of two profile wall pipes after being coupled with the terminal ends of the electrical resistance element extending from the pipe joint.

The electrical resistance element 120 shown in FIG. 24 is comprised of stainless steel screen. However, any electrically conductive material such as wire, screen, mesh, or helical resistance wire, is acceptable provided that, upon energization, it produces sufficient heat to fuse together the coupled pipe ends. The electrical resistance element 120 is configured to allow two terminal portions 126 and 128 to protrude from the pipe joint after the pipe ends are coupled together as shown in FIG. 25. The shape of the electrical resistance element can vary as long as it can be energized after the pipe ends 214 and 216 are coupled together. This can be accomplished by configuring the element 120 to have two terminal portions 126 and 128 which can be attached to a power source (not shown) after the pipe ends 214 and 216 are coupled together. As shown in FIG. 25, the two terminal portions 126 and 128 of the electrical resistance element 120 protrude from the pipe joint even though the pipe ends substantially abut against one another after coupling. The amount of time and energy required to fuse the pipe ends together differs depending on the size of the pipe and the wall thickness as well as the specific material from which the pipes are made. The energy required must be sufficient to generate enough heat to cause the pipes to fuse together.

The length of the electrical resistance element, as measured between screen edges 122 and 124, should be sufficiently longer than the outer circumference of the pipe surface to which is it affixed. In this configuration, the end margins 127 of the electrical resistance element 120 will overlap in place on the appropriate mating surface. The width of the central portion 121 of the electrical resistance element 120, as measured between screen sides 123 and 125, should be of a sufficient width to cover enough of the selected mating surface so that a strong fusion bond will be created upon energization of the electrical resistance element 120.

Protruding from the end portions 122 and 124 of the electrical resistance element 120 are terminal portions or end margins 126 and 128. Preferably the terminal portions 126 and 128 are merely an extension of the screen ends. However, any electrically conducting element, such as copper or stainless steel, attached to the end portions of the electrical resistance element 120 is acceptable. When using such a screen, the terminal portions are preferably configured so as to be readily attached to the leads of a power source such as an electrical welder. As shown in FIG. 25, this allows the terminal portions 126 and 128 of the element 120 to protrude from the pipe coupling after the pipes have been joined. By extending the terminal portions beyond the coupling, a power source can be connected to energize the electrical resistance element 120. Additionally, the terminal portions must be of sufficient size to allow for the transference of a sufficient amount of electrical current to the electrical resistance element 120 to fuse the pipe ends together. A positive lead of any given fusion welder is attached to one of the terminal portions and the negative lead from the given power source is attached to other terminal portion. The electrical resistance element 120 is then energized by the power source (not shown) causing electrical current to flow through the electrical resistance element 120. The electrical resistance element 120 should be energized long enough to cause the pipe ends to be fusion welded together. The amount of power and duration are determined by the types of thermoplastic material from which the pipes are made and the amount of heat necessary to create the fusion weld. The amount of heat and power necessary is known in the art of electrofusion welding using electrofusion couplers and inserts.

Any power source capable of supplying adequate power to electrical resistance element 120 is acceptable for the present invention. For example, a variable current electrical welder is acceptable as are any type of power supplies used in the prior art for fusion welding of thermoplastic pipes using electrofusion collars and inserts.

Figure 26:
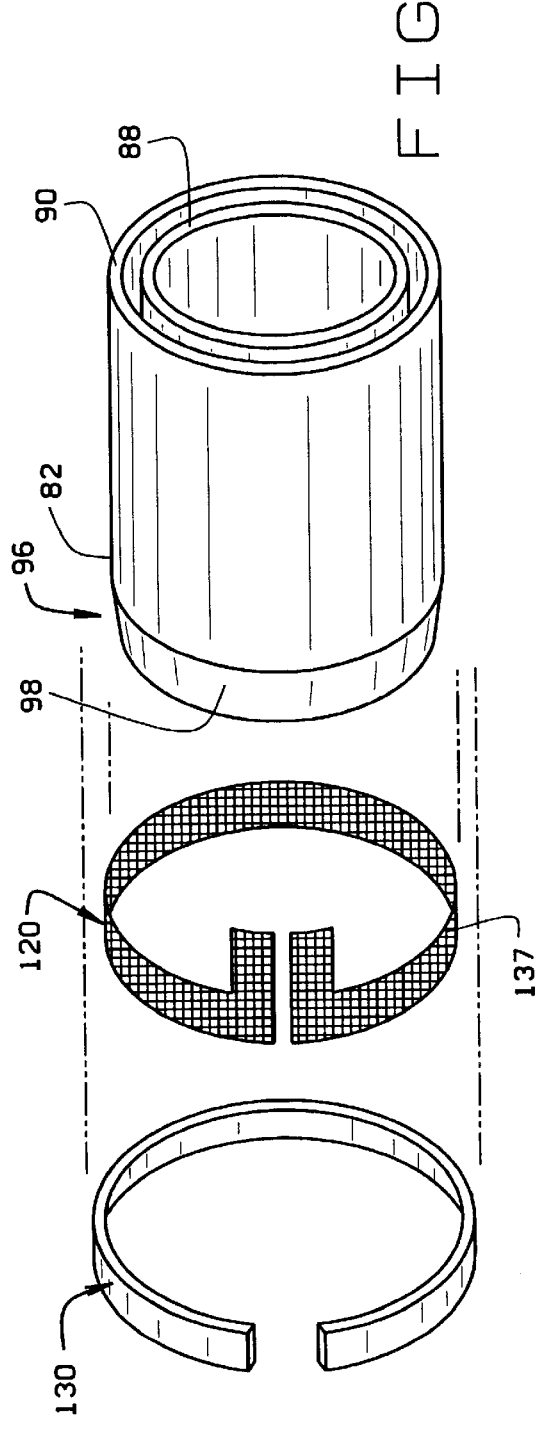
FIG. 26 shows an exploded oblique view of a profile wall pipe, an electrical resistance element, and a thermoplastic sheet.
Figure 27:
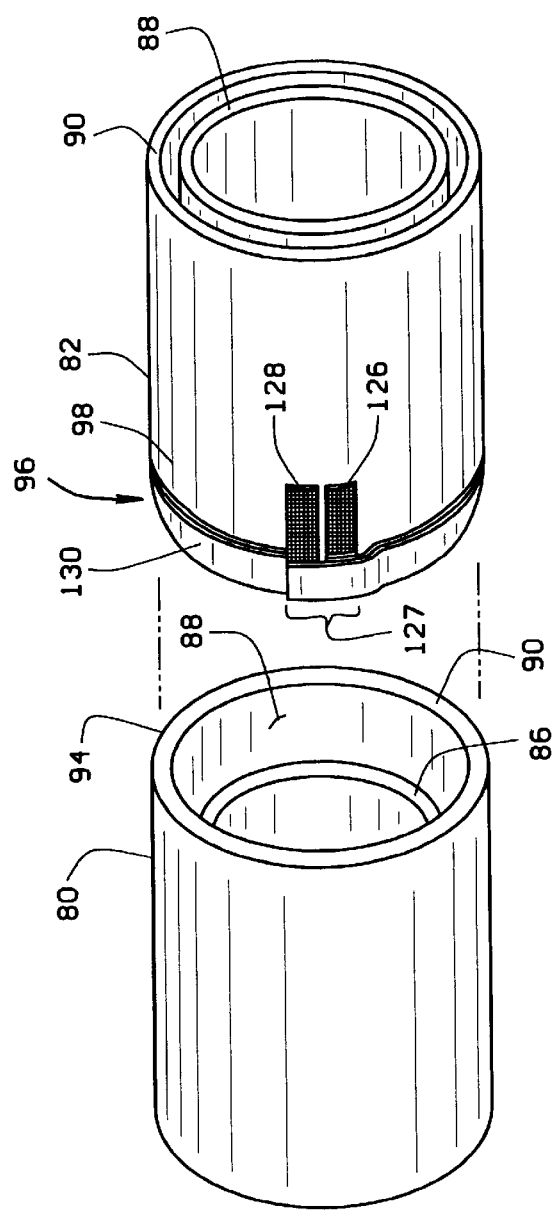
FIG. 27 shows an exploded oblique view of two profile wall pipes with an electrical resistance element and a thermoplastic sheet wrapped around an end of one of the pipes.
Figure 28:
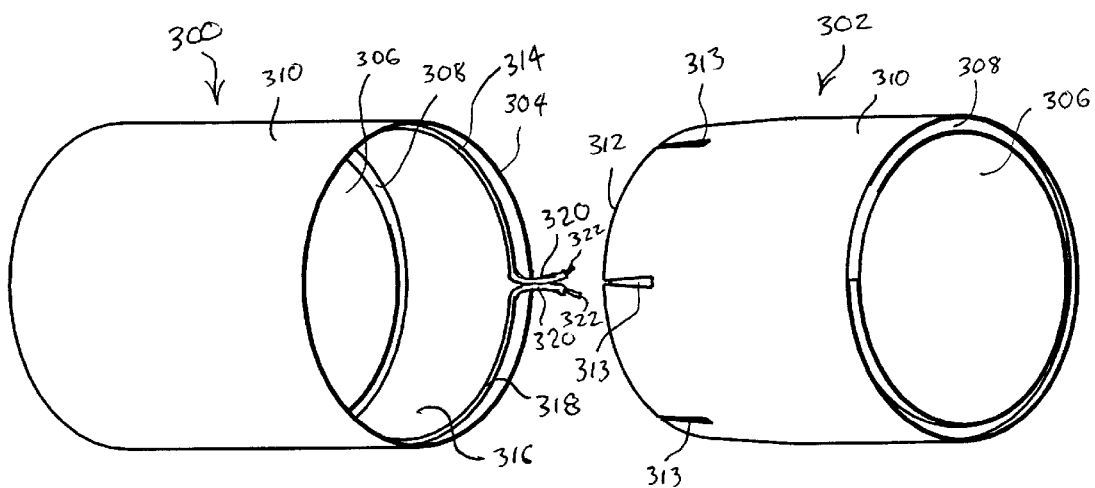
FIG. 28 is an oblique view of two profile wall pipes of a further embodiment of the invention, prior to joining the pipes.

In order to prevent the electrical resistance element 120 from shorting out due to the overlap of the ends of the electrical resistance element, a thin sheet 130 of thermoplastic material, as shown in FIGS. 26 and 27, can be wrapped around the exterior surface 137 of the electrical resistance element 120. By wrapping the thermoplastic sheet 130 around the exterior surface 137 of the electrical resistance element, the overlapping portions of the electrical resistance element 120 become electrically insulated from one another by the thermoplastic sheet 130. The thermoplastic sheet 130 is preferably made from the same type of thermoplastic material of the pipes to be joined to provide for consistency in the weld and the material. However, the thermoplastic sheet 130 can be formed any suitable electrically insulating material as long as the material does not inhibit the fusion welding of the pipes. The thermoplastic sheet 130 provides the necessary insulation to prevent an electrical short between the screen ends. By preventing such a short, the polyethylene sheet 130 allows the electrical resistance element 120 to provide uniform heating over the entire mating surface around which the electrical resistance element 120 is wrapped. The thickness of the thermoplastic sheet can be varied depending upon the material of which the sheet is made and the power to be used to cause the fusion weld as is determinable from appropriate charts known in the art. The thickness of the sheet 130 is configured to provide sufficient material to radially separate the end margins 127 of the electrical resistance element 120 when in the electrical resistance element 120 is in place on one of the pipe ends to prevent a short between the terminal portions. Additionally, the thickness of the sheet 130 is thin enough to allow the sheet to melt with the pipes being fused together. Because the existence of the sheet 130 adds material to the weld assembly, increasing the sheet thickness can provide for a more consistent weld.

Although the thermoplastic sheet is needed only where the element overlaps, the inventor has found that making the thermoplastic sheet approximately equal to the size of the element allows for a more consistent weld and eases the coupling of the pipes together by adding additional material into the fusion weld. When using such a thermoplastic sheet, the exterior surface of the electrical resistance element is wrapped with the thermoplastic sheet and both are then wrapped around or placed adjacent the selected mating surface. Thereafter, a clamp can be used to hold the combination in place on the mating surface while the element is energized for enough time and with enough power to cause the combination to adhere to the selected mating surface while the pipes are coupled together as determined by charts and as is known in the art of electrofusion welding. The heat created upon the energization of the electrical resistance element 120 softens the thermoplastic sheet and the mating surface of the pipe end. By applying pressure to the electrical resistance element, the thermoplastic sheet adheres to the element and the electrical resistance element will be urged into the selected mating surface. The necessary pressure can be applied with a clamp (not shown), or a binder (not shown) which can be shaped around or into the selected mating surface and over the element and thermoplastic sheet. Upon the re-hardening of the pipe surface after the electrical resistance element is disconnected from its power source and cools down, the electrical resistance element and thermoplastic sheet are embedded into the surface of the pipe.

As shown in FIG. 25, the terminal portions 126 and 128 of the electrical resistance element should protrude from the coupling. A power source (not shown) can thereafter be connected across the terminal portions to energize the electrical resistance element. As the electrical resistance element is energized, and thereby heats up, the interference fit between the first pipe end and the second pipe end develop sufficient bonding pressure as the mating surfaces soften and expand, causing pressure at the inner and outer walls of the mating surfaces. This produces a uniform and strong fusion bond between the two pipes. As shown in FIGS. 20 and 23, the end result is a singular length of thermoplastic profile wall pipe with a strong pipe joint that is substantially flush with the pipe walls, leaving no interior flow restrictions or exterior collars or obstructions.

It should be noted that any power source capable of supplying adequate power to the electrical resistance element is acceptable for the invention. For example, a variable current electrical welder is acceptable as are any type of power supplies used in the prior art for the fusion welding of thermoplastic pipes. Preferably, an electrofusion control element is used for the power source to furnish a predetermined amount of electrical current necessary to heat and fuse the pipe ends. The amount of power and duration of power supply are determined by the types of thermoplastic material from which the pipes are made and the amount of heat therefore necessary to create the fusion weld. As stated above, the amount of heat and power necessary for such fusion is known in the art of electrofusion welding.

The preferred embodiment of the invention is shown in FIGS. 28-31 and is an improvement upon the embodiments shown in FIGS. 18-23. Except as described below, the description of the embodiment shown in FIGS. 18-27 applies equally to the preferred embodiment.

As shown in FIGS. 28-31, the preferred embodiment is a coupling for profile wall thermoplastic pipe comprising first 300 and second 302 pipes. The first pipe 300 is configured and adapted to be devoid of substantially all of its inner wall 306 and substantially all of its helical rib 308 for an axial distance extending from an end 304 of the first pipe 300. Although such piping can be manufactured in this configuration, the configuration can also be formed by altering standard pipes in the field. Such alteration on large diameter pipes is preferably performed using a chainsaw to cut away the inner wall 306 completely and to remove substantially all of the helical rib 308 adjacent the end 304 of the first pipe 300, leaving a minimal portion of the helical rib immediately adjacent the outer wall 310 to avoid damaging the outer wall. On small diameter pipes, it is preferable to use a router, rather than a chainsaw. Regardless of how this configuration is formed, it is not critical that the axial amount of the inner wall 306 removed be identical to the axial amount of helical rib 308 removed. However, it is preferable that that the axial amount of helical rib removed be at least equal to the axial amount of the inner wall removed.

The second pipe is devoid of a circumferential portion of the helical rib 308 for an axial distance extending from an end 312 of the second pipe 302. When forming the second pipe 302 from an existing standard pipe using a chainsaw, only a minimal circumferential portion of the helical rib 308, having a radial width equal to that of the chainsaw blade, need be cut away. Residual stresses in the inner 306 and outer 310 walls of the profile wall pipes are created during manufacture and, as a result of these residual stresses, the inner 306 and outer 310 walls tend to "knuckle" towards each other as described above when the portion of helical rib 308 is removed. Preferably, a plurality of axial slots 313 are cut through the outer wall 310 of the second pipe to relieve hoop stress and thereby allow the outer wall to "knuckle" further than would otherwise occur. The slots 313 are preferably made with a chainsaw and are therefore rectangular slots approximately ⅜" in width.

Testing has revealed that the axial distance of helical rib 308 and inner wall 306 removed from the first pipe 300 is preferably less than the axial distance of helical rib removed from the second pipe 302. In particular, the inventor has discovered that 6", 8", 10", and 12" of the helical rib 308 and the inner wall 306 should be removed from 10–20", 21–50", 54", and 60–120" inner-diameter pipe, respectively, on the first pipe 300, while, 4", 5", 6", and 8" of helical rib should be removed from 10–20", 21–50", 54–60", and 66–120" inner-diameter pipe, respectively, on the second pipe 302.

Additionally, it has been found that the number of slots 313 made in the outer wall 310 adjacent the end 312 of the second pipe 302 is preferably 6, 8, 10, 12, 15, 16, 18, 22, and 24 for 10–12", 15–20", 21–24", 27–36", 40", 42", 48", 54–60", and 66–120" inner-diameter pipe, respectively. Furthermore, the slots preferably extend axially from the end 312 of the second pipe 302 for a distance of 2.5", 3", 3.5", 4", 4.25", 4.5", 5", and 6" for 10", 12", 15–20", 21–36", 40–42", 48", 54–60", and 66–120" inner-diameter pipe, respectively.

Rather than using a screen type electrical heating element, the preferred embodiment utilizes one or more thermoplastic coated, twisted wire heating elements or welding rods of the type disclosed in U.S. Pat. No. 5,407,520 to Butts et al. This type of heating element comprises a rod like core of thermoplastic material having a plurality of fine wires helically wound thereabout, surrounded by additional thermoplastic material. The additional thermoplastic material forms a coating configured to fuse to mating thermoplastic components when a sufficient current is passed through the wires and also prevents the wires of welding rod from electrically shorting when the rod overlaps or engages itself. The thermoplastic core of the welding rod allows the welding rod to deform or flatten when melted, thereby allowing the rod to conform to the contours of the components being fused. The welding rod is preferably approximately 3/16" in cross-sectional diameter and can easily be cut to a desired length.

Figure 29:
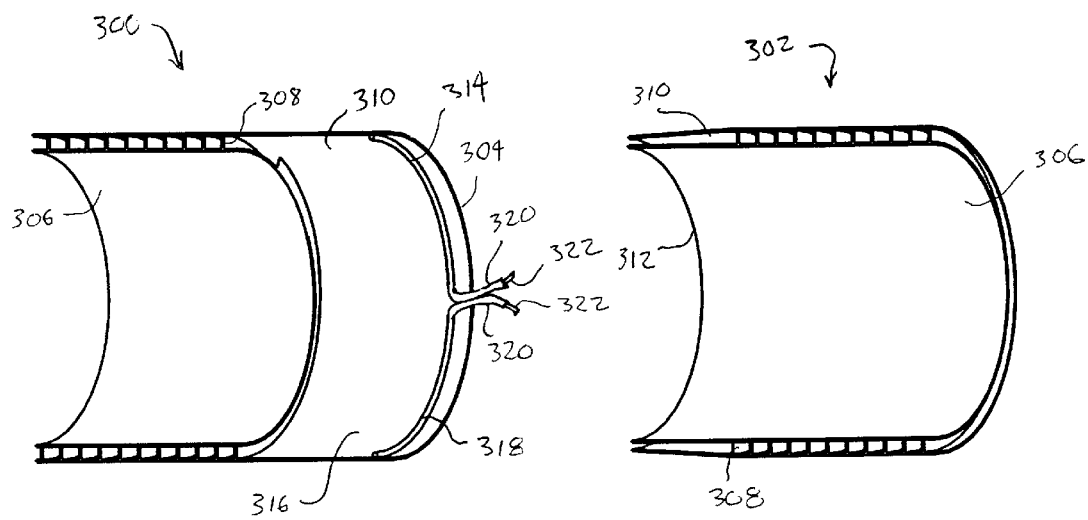
FIG. 29 is a cross-sectioned oblique view of the two pipes and the electrical resistance element of FIG. 28.

As shown in FIG. 29, the welding rod 314 is preferably attached circumferentially to an inner surface 316 of the outer wall 310 of the first pipe 300, prior to connecting the first and second 302 pipes together. This is preferably done using a hot air gun or in accordance with the specifications provided by the manufacturer of the particular welding rod 314 being used. The welding rod forms a generally closed loop portion 318 with opposite ends 320 turned at right angles and abutting each other as they extend axially from the end 304 of the first pipe 300. The closed loop portion 318 of the welding rod 314 is preferably positioned ¾" from the end 304 of the first pipe 300 with the closed loop portion of each additional welding rod being positioned at ¾" increments therefrom. If the outer wall 310 thickness of the first pipe 300 is greater than the cross-sectional diameter of the welding rod 314, it is preferable to use multiple welding rods such that the sum of the cross-sectional diameters of the welding rods exceeds the outer wall thickness. Thus, the number of welding rods used on conventional profile wall thermoplastic pipe is 1, 2, and 3 for 10–30", 36–78", and 84–120" inner-diameter pipe, respectively. The use of multiple welding rods, although not necessarily required to produce an air-tight joint, ensures that the joint will have sufficient axial strength to allow the joined pipes to be pulled through a culvert during rehabilitation.

Each of the opposite ends 320 of the welding rod 314 preferably extends a few inches from the end 304 of the first pipe 300 such that when the first and second 302 pipes are engaged with each other as described in reference to the embodiments of FIGS. 18–23, the opposite ends 320 of the welding rod 314 can be accessed from outside the pipes. A terminal connector 322 attached to the wires of the welding rod 314 on each of the opposite ends 320 facilitates connection of the welding rod to a power source.

Figure 30:
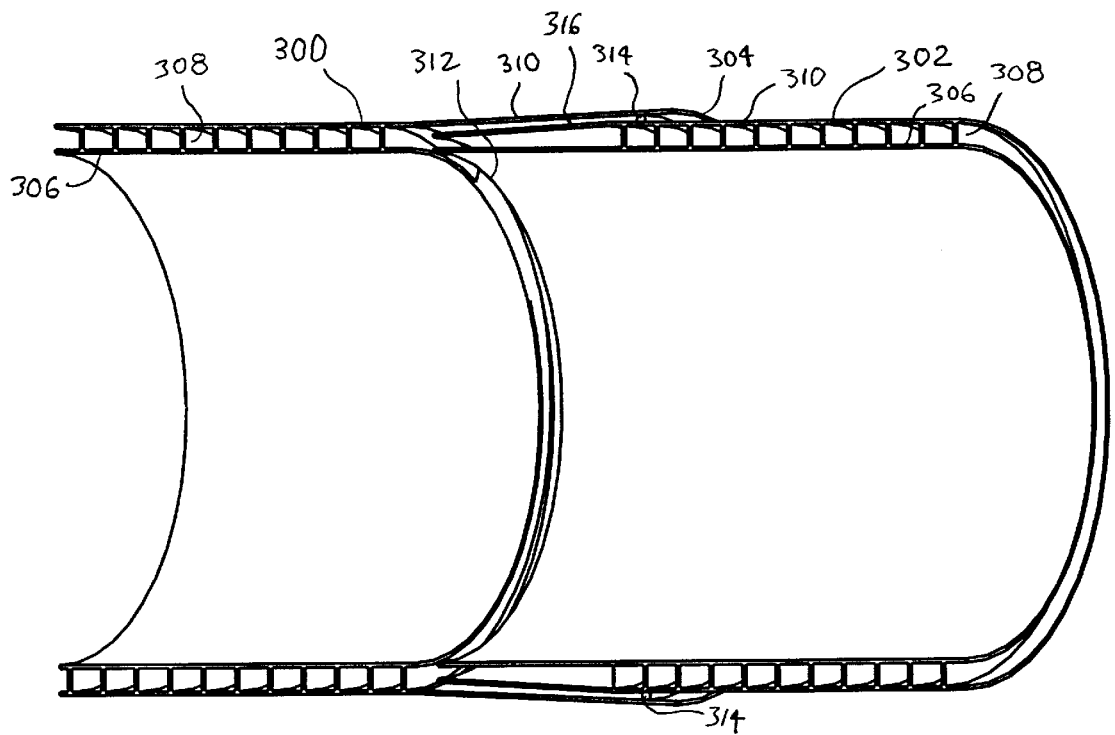
FIG. 30 is a cross-sectioned oblique view of the two pipes and the resistance element of FIG. 28, shown joined together prior to being electrofusion welded.

As shown in FIG. 30 prior to fusion, when the first 300 and second 302 pipes are joined, each of the welding rods 314 becomes sandwiched radially between the outer walls 310 of the pipes. Since the outer wall 310 of the second pipe 302 increases in diameter as it extends axially from the end 312 of the second pipe, the pipes can be brought together in a manner causing a radial interference between the outer wall of the second pipe and outer wall of the first pipe 300. Due to this interference, the outer walls 310 of the first 300 and second 302 pipes are compressed radially, thereby developing pressure on the welding rod 314 to ensure that the welding rod will properly fuse to both of the outer walls. The outer wall 310 and inner wall 306 of the second pipe 302 are also preferably left unattached to each other such that the outer wall, although "knuckled" toward the inner wall, will be resiliently deflected further toward the inner wall when the pipes are joined. By being resiliently deflected, the outer wall 310 of the second pipe 302 maintains radial pressure against the welding rod 314 as the welding rod deforms and thereby facilitates the electrofusion process.

The fusion process is performed using a power source capable of supplying a current of electricity through the welding rod 314 that is sufficient for generating enough heat to fuse the welding rod to the outer walls 310 of the first 300 and second 302 pipes. A separate power lead from the power source is connected to each of the terminal clips 322 on the opposite ends 320 of the welding rod(s) 314. When three or more welding rods 314 are used, multiple circuits may be required. Preferably, the power source is equipped with an ammeter and has an adjustable voltage output such that a constant amperage can be passed through each welding rod 314. It has been determined that preferably 6.5 amperes should be passed through each welding rod 314 for a period of 7–9 minutes during the electrofusion process. Either direct or alternating current can be used for this purpose.

The inventor has also discovered that it is beneficial to attach extended leads to the power supply. Extending the leads allows the power source to be located further from the welding rod(s) 314 during electrofusion, which is beneficial when placement of the power source closer is impracticable.

Figure 31:
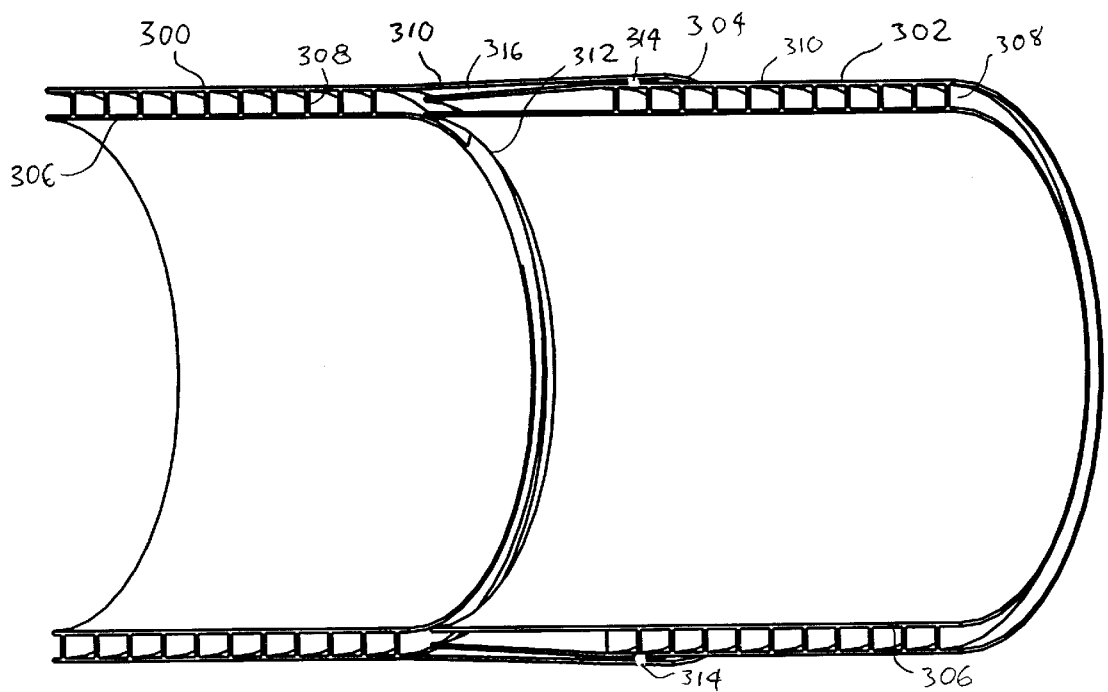
FIG. 31 is a cross-sectioned oblique view of the pipe ends of FIG. 28 shown secured together by electrofusion welding.

Once fused as described above, an air-tight joint is formed between the first 300 and second 302 pipes that has sufficient axial strength for pulling the pipes through a culvert. Like with the other embodiments described above, the fused joint is generally flush with the outer 310 and inner 306 walls of the first 300 and second 302 pipes, as shown in FIG. 31.

It should be understood that, like the embodiment shown in FIGS. 18–23 and described above, the disclosure of this embodiment could be utilized to alternatively fuse the inner walls of the first and second pipes. It should be clear that such an alternative would involve removing substantial all of the outer wall and helical rib of the first pipe for an axial distance, leaving the inner wall intact. Furthermore in such a situation, the welding rod(s) would preferably be attached an outer surface of the inner wall of the end of the first pipe end, and the slots would be cut into the inner wall of the second pipe end. Other changes or accommodations may also be required when practicing such an alternative embodiment, however, one skilled in the art with knowledge of the disclosure herein could easily foresee and perform such changes without undue burden.

While the present invention has been described in reference to specific embodiments, it should be understood that modifications and variations of the invention may be constructed without departing from the scope of the invention described in the following claims.

What is claimed:

1. A method of coupling profile wall thermoplastic pipes, the method comprising the steps of:

providing first and second thermoplastic pipes, each pipe having first and second coaxial, radially spaced cylindrical walls and rib portions joining the first and second walls, the first walls of both the first and second pipes being one of interior and exterior walls of the first and second pipes and the second walls of both the first and second pipes being the other of the interior and exterior walls, the first pipe having a first end margin of a first axial length extending from an end of the first pipe and the second pipe having a second end margin of a second axial length extending from an end of the second pipe;

removing from the first end margin substantially all of the rib portions and substantially all of the first wall of the first pipe;

removing from the second end margin substantially all of the rib portions of the second pipe; and coupling the first pipe with the second pipe such that at least a portion of the second wall of one of the first and second end margins overlaps at least a portion of the second wall of the other of the first and second end margins in a manner allowing the second wall of the first pipe to be secured to the second wall of the second pipe.

2. The method of claim 1, wherein the step of coupling the first pipe with the second pipe comprises:

resiliently deflecting the second walls of the first and second end margins in opposite radial directions relative to each other, thereby creating a radial interference pressure between the second wall of the first pipe and the second wall of the second pipe where the first pipe overlaps the second pipe.

3. The method of claim 1, further comprising the step of:

forming at least one slot through the second wall of the second pipe that extends axially inward from the end of the second pipe.

4. The method of claim 1, wherein the step of removing from the second end margin substantially all of the rib portions the second pipe comprises:

removing from the second end margin substantially all of the rib portions without removing the first wall of the second end margin.

5. The method of claim 4, wherein the step of coupling the first pipe with the second pipe comprises:

leaving the first and second walls of the second end margin unsecured to each other and deflecting the second wall of the second end margin radially toward the first wall of the second end margin.

6. The method of claim 1, further comprising the step of:

attaching an electrical heating element around the second wall adjacent the end of one of the first pipe and the second pipe where the heating element will be positioned radially between the second wall of the first pipe and the second wall of the second pipe when the first pipe is coupled with the second pipe, the heating element being configured to provide heat sufficient to fuse the second wall of the first pipe to the second wall of the second pipe.

7. The method of claim 6, further comprising the step of:

supplying an electrical current to the heating element to fuse the second wall of the first pipe to the second wall of the second pipe.

8. The method of claim 6, wherein the step of attaching an electrical heating element comprises:

attaching a stainless steel screen heating element around one of the second wall of the first pipe and the second wall of the second pipe.

9. The method of claim 6, wherein the step of attaching an electrical heating element comprises:

attaching a thermoplastic coated twisted wire heating element around one of the second wall of the first pipe and the second wall of the second pipe.

10. The method of claim 1, wherein the step of providing first and second thermoplastic pipes comprises:

providing first and second pipes each having the first wall being the interior wall and the second wall being the exterior wall.

11. A method of coupling profile wall thermoplastic pipes, the method comprising the steps of:

providing first and second thermoplastic pipes, each pipe having first and second coaxial, radially spaced cylindrical walls and rib portions joining the first and second walls, the first walls of both the first and second pipes being one of interior and exterior walls of the first and second pipes and the second walls of both the first and second pipes being the other of the interior and exterior walls, the first pipe having a first end margin of a first axial length extending from an end of the first pipe and the second pipe having a second end margin of a second axial length extending from an end of the second pipe;

forming the first end margin to be devoid of substantially all of the rib portions and substantially all of the first wall of the first pipe;

forming the second end margin to be devoid of substantially all of the rib portions of the second pipe; and coupling the first pipe with the second pipe such that at least a portion of the second wall of one of the first and second end margins overlaps at least a portion of the other of the first and second end margins in a manner allowing the second wall of the first pipe to be secured to the second wall of the second pipe.

12. The method claim 11, wherein the step of coupling the first pipe with the second pipe comprises:

resiliently deflecting the second walls of the first and second end margins in opposite radial directions relative to each other, thereby creating a radial interference pressure between the second wall of the first pipe and the second wall of the second pipe where the first pipe overlaps the second pipe.

13. The method of claim 11, further comprising the step of:

forming at least one slot through the second wall of the second pipe that extends axially inward from the end of the second pipe.

14. The method of claim 11, wherein the step of forming the second end margin to be devoid of substantially all of the rib portions of the second pipe comprises:

forming the second end margin to be devoid of substantially all of the rib portions in a manner such that the first wall extends axially to the end of the second pipe.

15. The method of claim 14, wherein the step of coupling the first pipe with the second pipe comprises:

leaving the first and second walls of the second end margin unsecured to each other and deflecting the second wall of the second end margin radially toward the first wall of the second end margin.

16. The method of claim 11, further comprising the step of:

attaching an electrical heating element around the second wall adjacent the end of one of the first pipe and the second pipe where the heating element will be positioned radially between the second wall of the first pipe and the second wall of the second pipe when the first pipe is coupled to the second pipe, the heating element being configured to provide heat sufficient to fuse the second wall of the first pipe to the second wall of the second pipe.

17. The method of claim 16, further comprising the step of:

supplying an electrical current to the heating element to fuse the second wall of the first pipe to the second wall of the second pipe.

18. The method of claim 16, wherein the step of attaching an electrical heating element comprises:

attaching a stainless steel screen heating element around one of the second wall of the first pipe and the second wall of the second pipe.

19. The method of claim 16, wherein the step of attaching an electrical heating element comprises:

attaching a thermoplastic coated twisted wire heating element around one of the second wall of the first pipe and the second wall of the second pipe.

20. The method of claim 11, wherein the step of providing first and second thermoplastic pipes comprises:

providing first and second pipes each having the first wall being the interior wall and the second wall being the exterior wall.

* * * * *